United States Patent
Cortopassi

(10) Patent No.: US 11,375,672 B2
(45) Date of Patent: Jul. 5, 2022

(54) SYSTEM FOR HEDGE PRUNING AND METHOD FOR MAKING AND USING THE SAME

(71) Applicant: San Tomo, Inc., Stockton, CA (US)

(72) Inventor: Dean Albert Cortopassi, Stockton, CA (US)

(73) Assignee: SAN TOMO, INC., Stockton, CA (US)

( * ) Notice: Subject to any disclaimer, the term of this patent is extended or adjusted under 35 U.S.C. 154(b) by 0 days.

(21) Appl. No.: 16/998,955

(22) Filed: Aug. 20, 2020

(65) Prior Publication Data
US 2021/0051859 A1     Feb. 25, 2021

Related U.S. Application Data

(60) Provisional application No. 62/966,982, filed on Jan. 28, 2020, provisional application No. 62/889,270, filed on Aug. 20, 2019.

(51) Int. Cl.
*A01G 3/053*     (2006.01)
*A01G 3/04*     (2006.01)

(52) U.S. Cl.
CPC ......... *A01G 3/0535* (2013.01); *A01G 3/0435* (2013.01); *A01G 2003/0443* (2013.01)

(58) Field of Classification Search
CPC ............... A01G 3/0535; A01G 3/0435; A01G 2003/0443
See application file for complete search history.

(56) References Cited

U.S. PATENT DOCUMENTS

| | | | | |
|---|---|---|---|---|
| 3,487,614 A | * | 1/1970 | Uhor | A01G 3/0435 56/233 |
| 3,590,663 A | * | 7/1971 | Yamaguchi | F16H 47/08 477/135 |
| 3,597,908 A | * | 8/1971 | Schaefer | A01G 3/04 56/233 |

(Continued)

FOREIGN PATENT DOCUMENTS

| | | |
|---|---|---|
| DE | 20309633 U1 | 8/2003 |
| DE | 102010037792 A1 | 6/2011 |

OTHER PUBLICATIONS

International Search Report and Written Opinion, Application No. PCT/US2020/047266, dated Nov. 25, 2020.

*Primary Examiner* — Sean M Michalski
(74) *Attorney, Agent, or Firm* — Orrick, Herrington & Sutcliffe LLP

(57) ABSTRACT

System for hedge pruning and method for making and using the same. An exemplary system for hedge pruning includes a mounting assembly for connecting to a mobile platform, the mounting assembly defining a pivot point region thereon, a cutting arm rotatably coupled to the mounting assembly at the pivot point region. And a blade assembly connected to an end region of the cutting arm such that the blade assembly prunes a hedge along an arc defined based upon rotation of the cutting arm about the pivot point region. Advantageously, the system provides an ability to discriminate selected plants in a hedge to improve grove health and exploit alternate bearing nature of certain groves, resulting in a more consistent production each year. Differentiated treatment can be provided within a row of the plants while pruning the hedges in an automated manner that is more efficient than manual pruning.

20 Claims, 44 Drawing Sheets

(56) References Cited

U.S. PATENT DOCUMENTS

| | | | | |
|---|---|---|---|---|
| 3,913,304 A * | 10/1975 | Jodoin | A01G 3/0435 | 56/235 |
| 4,067,178 A * | 1/1978 | Miller | A01G 3/0435 | 56/235 |
| 4,074,510 A * | 2/1978 | Teagle | A01D 34/435 | 56/12.7 |
| 4,200,015 A * | 4/1980 | Gerber | B26D 5/00 | 83/22 |
| 4,572,044 A * | 2/1986 | Antonissen | B26D 5/20 | 83/364 |
| 4,638,888 A * | 1/1987 | Coy | B66B 1/24 | 187/270 |
| 4,721,028 A * | 1/1988 | Lucas | B30B 15/16 | 91/433 |
| 4,873,818 A * | 10/1989 | Turner | A01D 34/866 | 56/10.8 |
| 4,970,791 A * | 11/1990 | Vergara | A01G 3/053 | 30/216 |
| 5,042,727 A * | 8/1991 | Plante | A01G 23/093 | 241/101.72 |
| 5,088,532 A * | 2/1992 | Eggers | B27L 11/002 | 144/176 |
| 5,107,592 A * | 4/1992 | Downey | A01G 3/0417 | 30/379.5 |
| 5,365,812 A * | 11/1994 | Hamden | B23D 47/042 | 700/167 |
| 5,378,852 A * | 1/1995 | Manor | A01G 23/093 | 144/24.13 |
| 5,430,999 A * | 7/1995 | Grant | B23D 45/105 | 56/11.9 |
| 5,644,915 A * | 7/1997 | Dressing | B30B 15/24 | 60/426 |
| 5,655,581 A * | 8/1997 | Craft | A01G 23/067 | 144/24.12 |
| 5,694,821 A * | 12/1997 | Smith | B23D 59/002 | 700/188 |
| 5,823,238 A * | 10/1998 | Bohnke | A01G 23/067 | 144/24.12 |
| 6,085,505 A * | 7/2000 | Edwards | A01G 3/0426 | 172/216 |
| 6,151,876 A * | 11/2000 | Van Der Burg | A01G 3/0435 | 56/1 |
| 6,286,905 B1 * | 9/2001 | Kimura | B23D 57/02 | 125/13.01 |
| 6,374,538 B1 * | 4/2002 | Morris | A01D 46/28 | 47/1.01 R |
| 6,718,661 B1 * | 4/2004 | Miller | E02F 3/962 | 37/395 |
| 7,150,300 B1 * | 12/2006 | Peterson | A01G 23/067 | 144/24.12 |
| 9,458,601 B2 * | 10/2016 | Shipman | E02F 3/3677 | |
| 11,058,064 B2 * | 7/2021 | Combs, III | A01G 23/095 | |
| 2002/0007711 A1 * | 1/2002 | Smith | B23D 59/001 | 83/76 |
| 2003/0024224 A1 * | 2/2003 | Frank | A01D 34/866 | 56/14.7 |
| 2005/0000202 A1 * | 1/2005 | Scordilis | A01D 34/863 | 56/14.7 |
| 2005/0109176 A1 * | 5/2005 | Wilson | B23D 59/001 | 83/13 |
| 2008/0066827 A1 * | 3/2008 | Torgersen | A01G 3/08 | 144/4.1 |
| 2009/0193950 A1 * | 8/2009 | Bounds | E01B 29/16 | 83/471.3 |
| 2010/0005940 A1 * | 1/2010 | Clark, II | B23D 55/088 | 83/820 |
| 2011/0138983 A1 * | 6/2011 | Clark, II | B63B 35/03 | 83/801 |
| 2016/0311124 A1 * | 10/2016 | Franzius | G05B 19/182 | |
| 2017/0156270 A1 * | 6/2017 | Borio | A01G 3/08 | |
| 2019/0257058 A1 * | 8/2019 | Merkt | E02F 3/783 | |
| 2020/0245553 A1 * | 8/2020 | Hoffman | A01D 34/283 | |

* cited by examiner

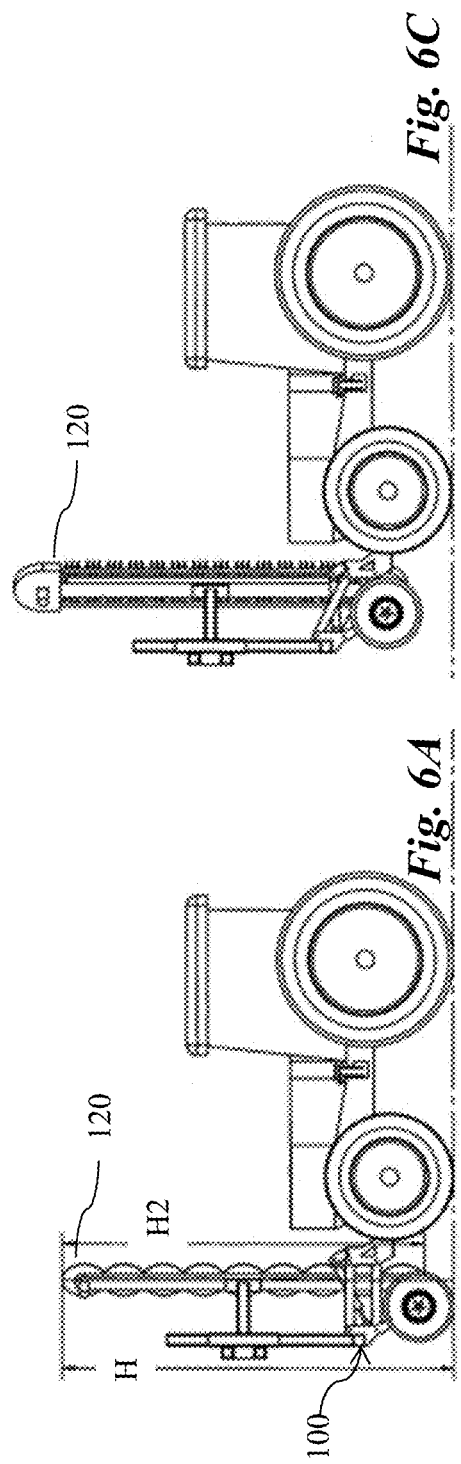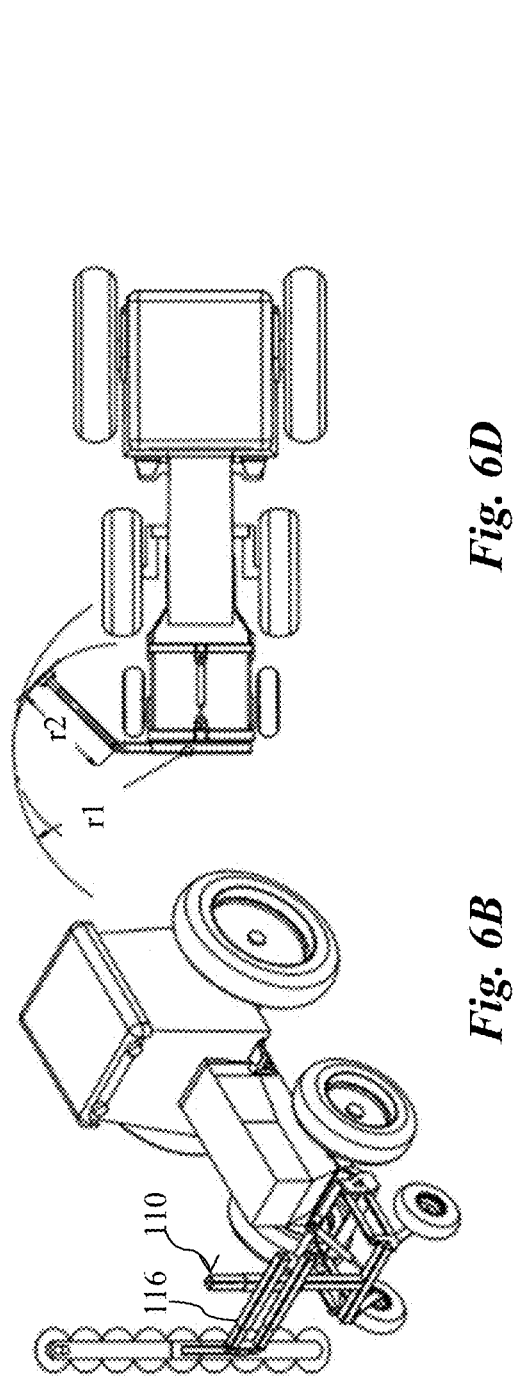
Fig. 6A
Fig. 6B
Fig. 6C
Fig. 6D

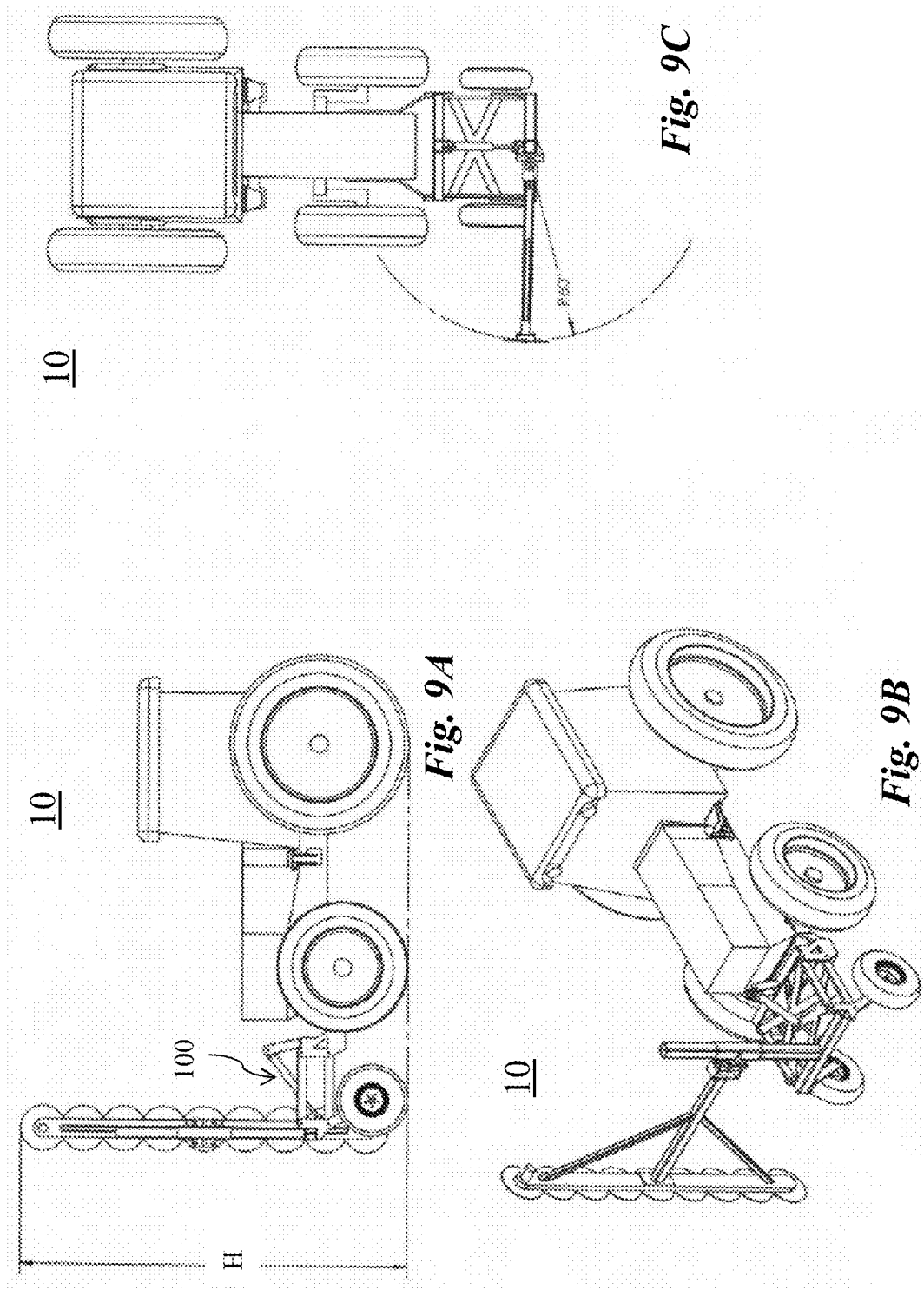

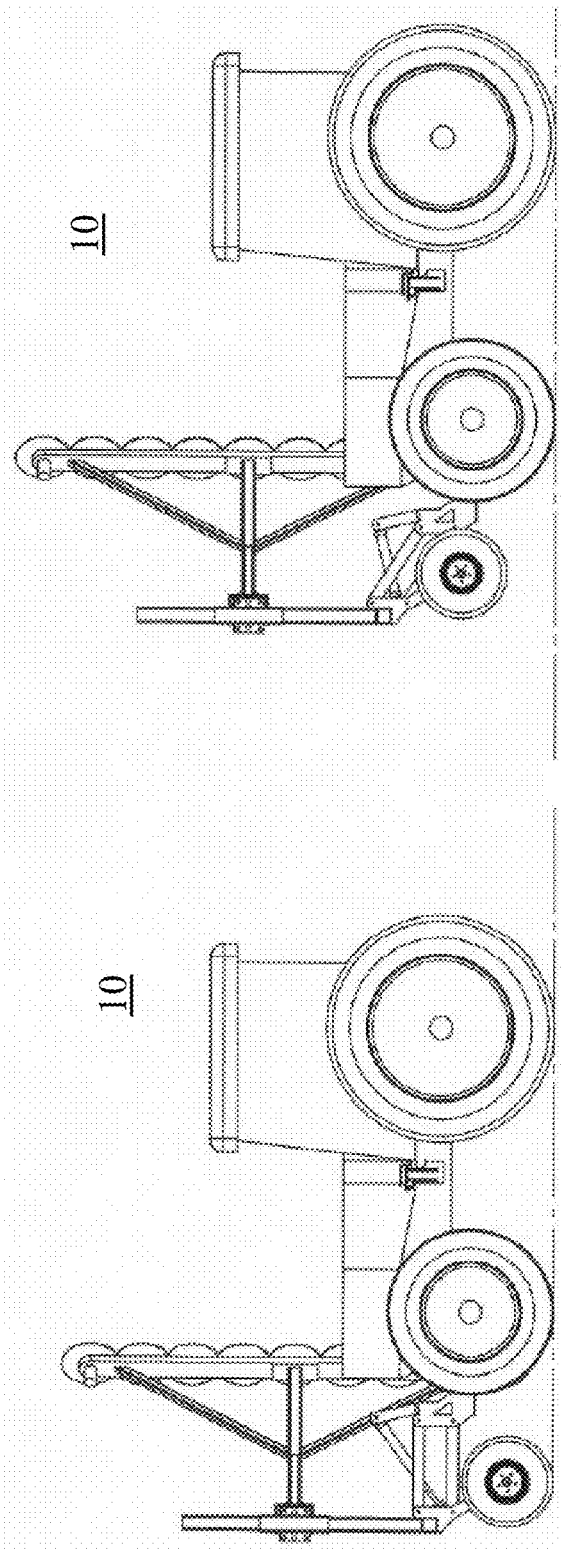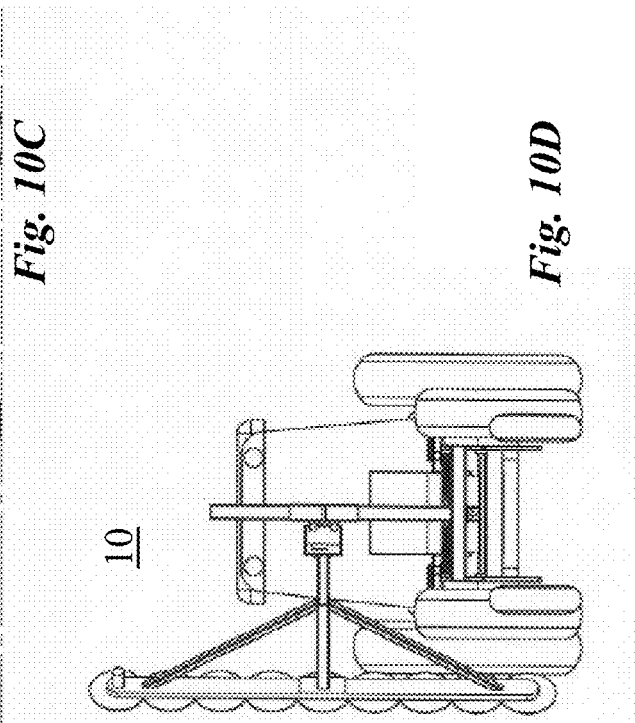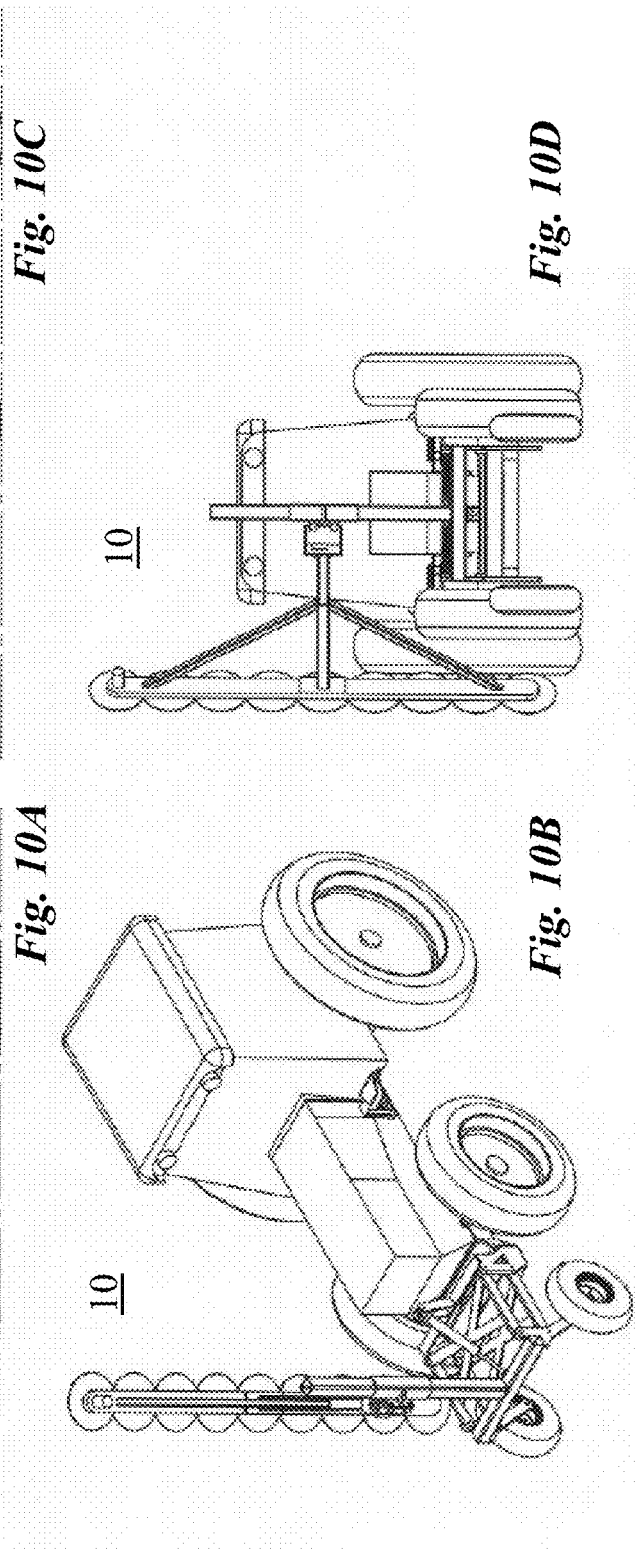

SYSTEM FOR HEDGE PRUNING AND METHOD FOR MAKING AND USING THE SAME

CROSS-REFERENCE TO RELATED APPLICATIONS

This application claims priority to U.S. provisional patent application, Ser. No. 62/889,270, filed on Aug. 20, 2019 and U.S. provisional patent application, Ser. No. 62/966,982, filed on Jan. 28, 2020. Priority to the provisional patent applications is expressly claimed, and the disclosures of the provisional applications are hereby incorporated herein by reference in their entirety and for all purposes.

FIELD

The disclosed embodiments relate generally to hedging and more particularly, but not exclusively, to systems for hedge pruning and methods for making and using the same.

BACKGROUND

In agriculture, a variety of trees are grown in hedges to increase production per unit area and ease mechanical harvesting. For example, although olive trees have traditionally been grown one at a time with each tree significantly spaced from one another (e.g., 50 trees per acre; about 30-50 feet between trees), a Super High Density (SHD) or Super Intensive planting method—by which olive trees are grown in a hedge-like arrangement—has recently been adopted in the olive oil industry.

The practice of hedging olive trees, rather than pruning specific and individual limbs and branches, is unique to olive trees grown using the SHD method. Specifically, trees are planted in tight rows to facilitate automated pruning and harvesting. Typical spacing for SHD plantings is 5 feet between trees and 12 feet between rows, where the spacing can vary by several feet in both dimensions in practice.

Current methods for hedging SHD olive trees involve linear hedging indiscriminately down the full length of a row of trees as an attempt to automate hand pruning. The linear hedging is typically done by driving a straight saw along the entire row. It is used in conjunction with hand pruning to manage tree size, shape, and health. Current hedging results in all trees within a given row being cut exactly by the same amount. Thus, each tree can be pruned too much or too little. In other words, the conventional method cannot accommodate unique tree growth and pruning needs to properly manage grove health, particularly due to the alternate bearing nature of olive trees.

Even though some growers are hedging rows at different widths to balance production, each cut is still performed down an entire row. Thus, each tree in the row can still be pruned too much or too little.

In view of the foregoing, there is a need for an improved system and method for hedge pruning that overcome the drawbacks of existing solutions.

BRIEF DESCRIPTION OF THE DRAWINGS

FIG. 4A indicates the system 100 as having a height of H.

FIGS. 6A, 6B, 6D are exemplary detail drawings illustrating a side view, a perspective view, and a top view, respectively, of the system of FIG. 5.

FIG. 6C is a detail drawing illustrating an alternative exemplary embodiment of the system of FIG. 5, wherein the blade assembly includes a belt of blades.

FIGS. 9A-9C are exemplary detail drawings illustrating a side view, perspective view, side view, and top view, respectively, of the system of FIG. 7.

FIGS. 10A-10B are exemplary detail drawings illustrating side views illustrating the system of FIG. 7 in lowered and raised positions, respectively.

FIGS. 10C-10D are exemplary drawings illustrating a perspective view and a side view, respectively, of the system of FIG. 7.

Figure 1:
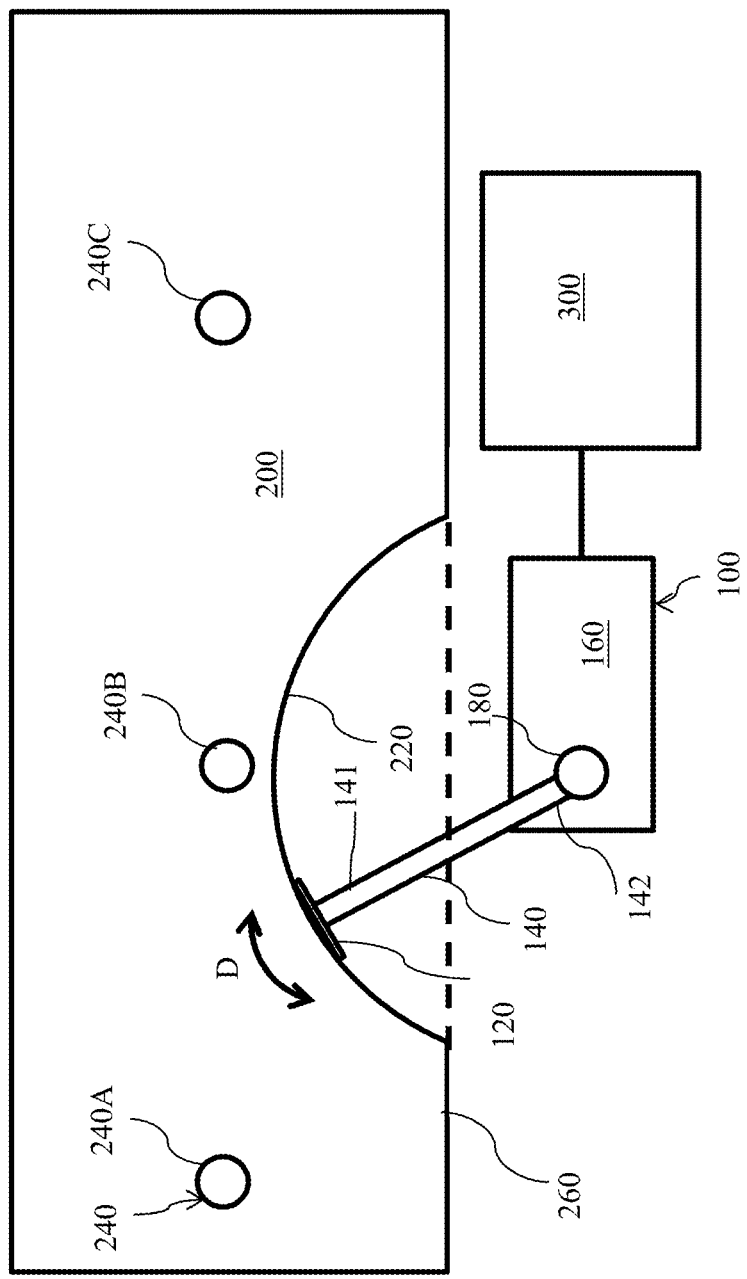
FIG. 1 is a diagram illustrating one exemplary embodiment of a system for hedge pruning.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Because currently-available systems and methods for hedge pruning are incapable of automatic pruning and accommodating individual trees, an improved system and method for hedge pruning that can overcome the drawbacks as set forth above can prove desirable and provide a basis for a wide range of applications, such as efficiently pruning hedges for a variety of plants including, but not limited to, olive trees, fruit trees, shrub, bush, and so on. Stated somewhat differently, the disclosed systems and methods can be used for pruning any hedge in which the plants need individualized pruning or in which the amount of pruning need to vary at selected locations of the hedge. Such hedges include, for example, a hedge formed with multiple types of plants, and/or a hedge made of plants that are alternate bearing (e.g., biennial bearing).

FIG. 1 is a schematic diagram of a system 100 for pruning a hedge 200 in an environment 10. The hedge 200 can include a row of uniform and/or different plants, illustratively shown as plants 240A-240C, that are planted at a selected density. Optionally, the hedge 200 can be topped, hedged, and/or skirted in any conventional manner prior to (or during, or after) using the system 100. The system 100 can include a blade assembly 120 configured for trimming and/or pruning the hedge 200. The blade assembly 120 can include any suitable arrangement of cutting tools, such as knives, blades, and/or the like. In one embodiment, the blade assembly 120 can include an array of rotary saws or saw blades. Additionally and/or alternatively, the blade assembly 120 can include a belt of blades, a chain of blades, a band saw, and/or a combination thereof.

The system 100 can include a cutting arm 140 having an elongated shape of a selected length. The cutting arm 140 has a first end region 141 and a second end region 142 opposite to the first end region 141. The first end region 141 is shown as being connected to the blade assembly 120.

The system 100 is shown as including a mounting assembly 160 coupled to an optional mobile platform 300. The mounting assembly 160 can include a mounting framework 162 (illustrated in FIG. 13) that can include any suitable framework structure for at least mechanically provide support and connections needed for the system 100. The mounting assembly 160 is shown as having a pivot point region 180 that is rotatably connected to the second end region 142 of the cutting arm 140. During operation, the mobile platform 300 can move to a selected distance from the hedge 200 so that the system 100 can prune the hedge 200.

The cutting arm 140 can be configured to rotate about the pivot point region 180. Rotation of the cutting arm 140 is shown as driving the blade assembly 120 to travel in one or both directions D. The blade assembly 120 can thus prune the part of the hedge 200 that is in contact with the blade assembly 120 and is shown as cutting into the sidewall 260 of the hedge 200 to form a notch or dent defined by an arc 220. In some embodiments, the system 100 can be configured in the manner as described below, such that a rotating speed of the cutting arm 140 can be modulated based upon a resistance that the blade assembly 120 receives during pruning. For example, when the blade assembly 120 cuts heavily-textured, high-density or old plants, blades of the blade assembly 120 encounter high resistance. Slowing down the rotating speed of the cutting arm 140 can prevent too much pressure increase on the blades, so the tip speed of the blades can be maintained. Advantageously, the system 100 can cleanly cut the plant 240B while preventing damage to the blades of the blade assembly 120.

The length of the cutting arm 140 can optionally be adjusted as desired. For example, the cutting arm 140 can having a telescopic pipe structure (shown in FIG. 14), or a structure including one or more nested pipes. Control of the length of the cutting arm 140 can be implemented by using any suitable robotic arm control technique, for example. Shape of the arc 220 can thus be customized with flexibility.

As a result, the plant 240B can be pruned more than the plants 240A, 240C. Advantageously, the system 100 can individually prune trees to a desired size, resulting in a more consistent production year in and year out. Such an ability to discriminate selected plants in a given row can improve grove health and, specifically for olive growth, exploit the alternate bearing nature of olive groves. For example, the notch or opening formed in the hedge 200 via pruning can allow sunlight to penetrate into the inner portion of the tree 240B and stimulate fast regrowth and regeneration of the fruit bearing wood of the tree 240B. The unpruned leaf surface of the trees 240A-240C can remain, thereby continuing to produce nutrient for generating new fruit bearing wood.

The mobile platform 300 can include any suitable vehicles that can travel and transport the system 100 therewith. For example, the mobile platform 300 can include, but is not limited to, motor vehicles, tractors, bicycles, automobiles, trucks, trains, helicopters, aircraft, unmanned aerial vehicle (UAV), boats (e.g., for plants rooted in water), ships, various hybrids thereof, and the like. In some embodiments, the mobile platform 300 can include a tractor.

The mounting assembly 160 can be connected to the mobile platform 300 in any suitable manner. For example, the mounting assembly 160 can be connected to the mobile platform 300 via a mechanical connection. Optionally, the mobile platform 300 can supply pressurized liquid (for example, oil), air, or gas to the mounting assembly 160 via pipes, valves, and/or tubes to provide hydraulic power to operate the system 100. For example, the system 100 can be powered by a power take-off (PTO)-driven hydraulic pump. Additionally and/or alternatively, the mobile platform 300 can supply electricity to the mounting assembly 160 via wires or cables to provide electric power for operating the system 100.

Although FIG. 1 shows a single arc 220 formed about the pivot point region 180 at a constant radius for illustrative purposes only, the system 100 can trim the hedge 200 along any number of uniform and/or different arcs 200, without limitation. Advantageously, pruning of each individual plant can be further customized for the specific shape of the plant. Although FIG. 1 shows a single cutting arm 140 pruning at one location on the hedge 200 for illustrative purposes only, the system 100 can include one or more uniform and/or different cutting arms 140 for pruning one or more hedges 200, without limitation. For example, the system 100 can include two cutting arms 140 pruning two adjacent hedges 200, so efficiency of pruning can be further improved. Although FIG. 1 shows one system 100 for illustrative purposes only, the mobile platform 300 can be connected to one or more uniform and/or different systems 100 in any manner (for example, in parallel and/or in series or tandem), without limitation. By operating multiple systems 100, efficiency of pruning can be further improved.

Although FIG. 1 shows the blade assembly 120 as pruning a top (or skyward) surface of the hedge 200 for illustrative purposes only, the blade assembly 120 can prune the hedge 200 at any selected height that can be lower than and/or equal to the height of the top surface of hedge 200.

Although FIG. 1 shows the cutting arm 140 as moving in a plane horizontal to the ground and shows the arc 220 as having a radius of curvature equal to the length of the cutting arm 140 for illustrative purposes only, the cutting arm 140 can move in any plane of a selected orientation. And the radius of curvature of the arc 220 may be equal to, or different from, the length of the cutting arm 140.

Figure 2:
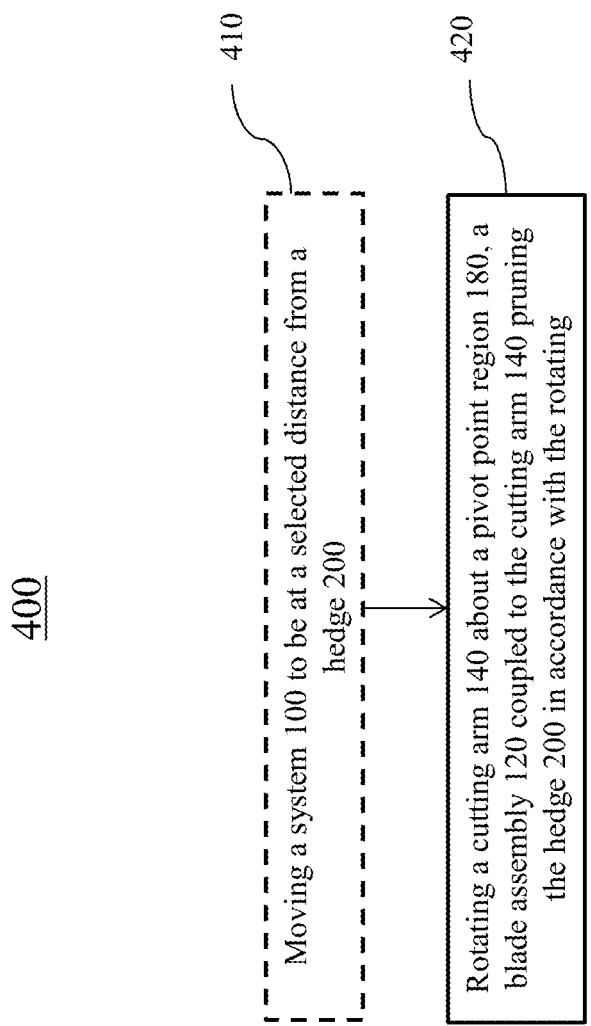
FIG. 2 is a flow chart illustrating one exemplary embodiment of a method for pruning using the system of FIG. 1.

Turning to FIG. 2, an exemplary method for pruning the hedge 200 (shown in FIG. 1) using the system 100 is shown. The system 100 is optionally moved, at 410, to be at a selected distance from the hedge 200. For example, the system 100 can be moved by driving the mobile platform 300 to a location close to the plant 240B (shown in FIG. 1).

The cutting arm 140 is rotated, at 420, about the pivot point region 180. The blade assembly 120 can prune the hedge 200 along the arc 220 defined by the rotating of the cutting arm 140. Advantageously, the method 400 can provide differentiated treatment within a row of the plants while pruning the hedge 200 in an automated manner that is more efficient than manual pruning.

Figure 3:
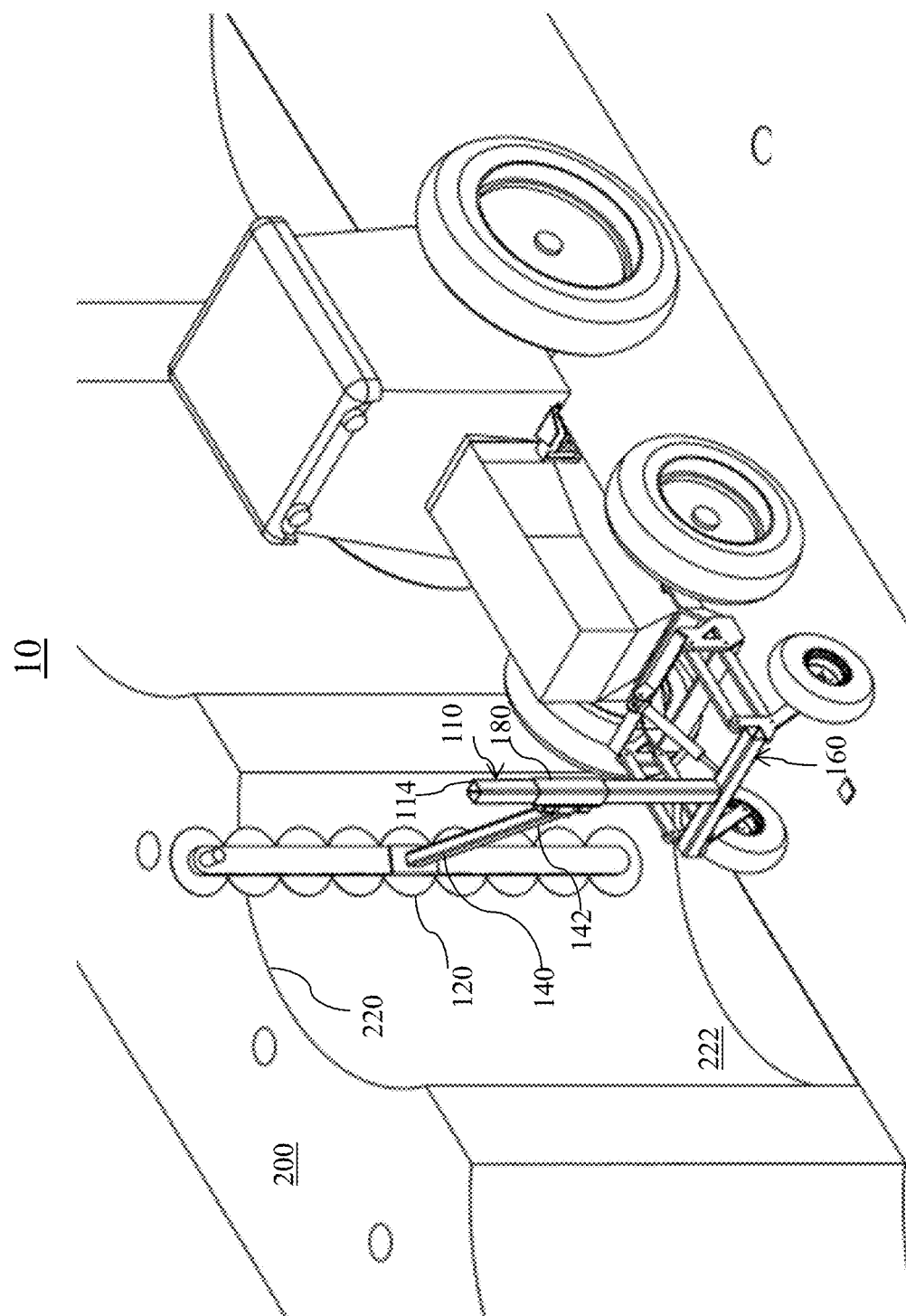
FIG. 3 is a detail drawing illustrating an alternative exemplary embodiment of the system of FIG. 1, wherein the system includes a standing member.

Turning to FIG. 3, the mounting assembly 160 can include a standing member 110. The standing member 110 is used for defining the pivot point region 180, such that when the cutting arm 140 swings about the pivot point region 180, the standing member 110 can be stationary relative to the pivot point region 180.

Figure 11:
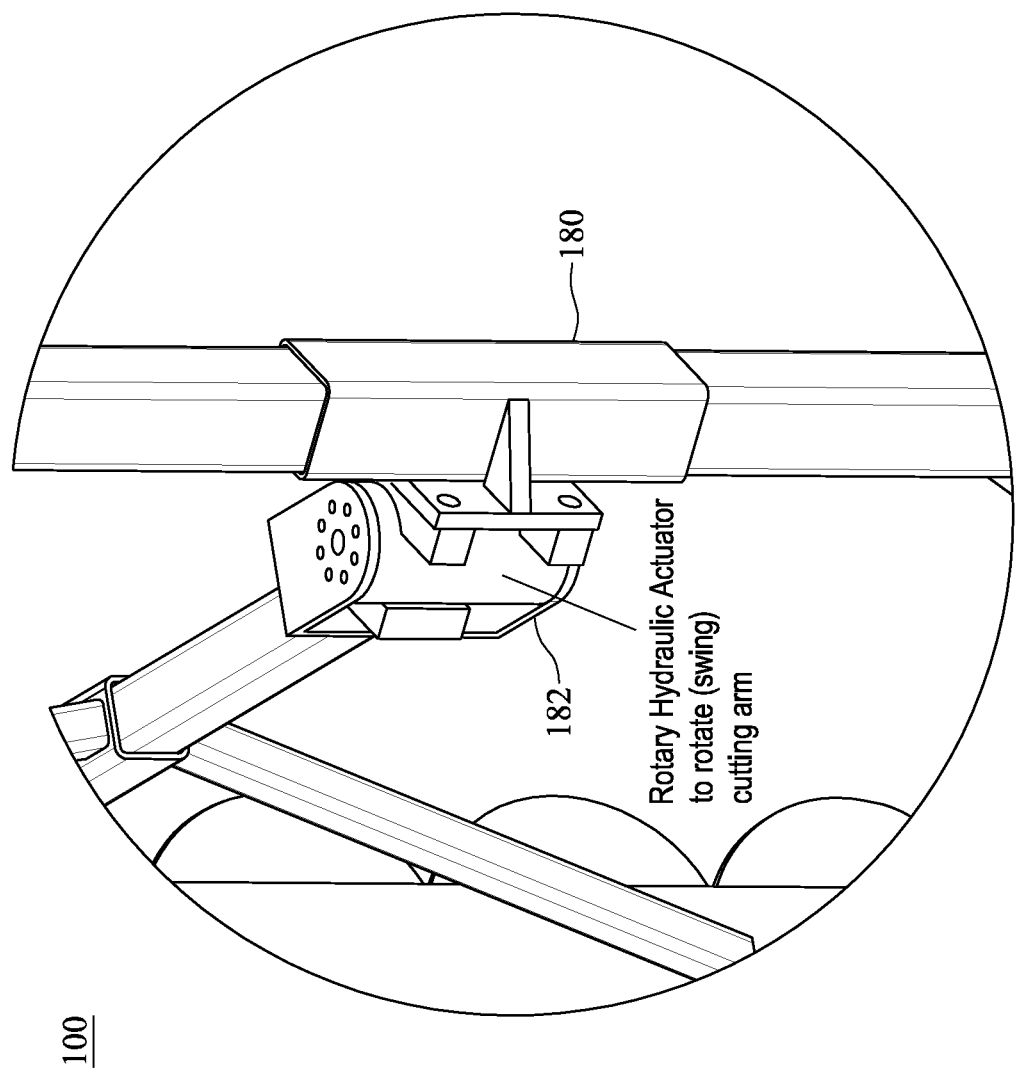
FIG. 11 is an exemplary detail drawing illustrating the system of FIG. 7, wherein a pivot point region of the system is shown.

The pivot point region 180 can accommodate any connecting device connected to a selected portion of the standing member 110 for joining the cutting arm 140 with the standing member 110. Exemplary connecting device can include a mechanical connection such as cooperating detents including any combination of mating elements, such as blocks, tabs, pockets, slots, ramps, locking pins, cantilevered members, support pins, brackets, and the like, that may be selectively or automatically engaged and/or disengaged to couple or decouple the cutting arm 140 and the standing member 110. The connecting device can include a rotatable joint 182 (shown in FIG. 11, for example) such that the cutting arm 140 can rotate about the pivot point region 180. An exemplary rotatable joint 182 can include a rotary actuator that is driven via hydraulic and/or electric power. Optionally, position of the pivot point region 180 on the standing member 110 can be adjusted such that height of the cutting arm 140, for example, can be adjusted.

The standing member 110 is shown as including an elongated body 114 having a first end region 111 (shown in FIG. 4A) connected to the rest of the mounting assembly 160 and a second end region 112 (shown in FIG. 4A) extending distally from the rest of the mounting assembly 160. The length of the elongated body 114 optionally can be adjusted in a manner that is similar to adjustment of the length of the cutting arm 140. Control of the length of the elongated body 114 can be implemented by using any suitable robotic arm control technique, for example. Height of the pruning can thus be customized with flexibility.

The blade assembly 120 is shown as having an elongated shape. Stated somewhat differently, the blade assembly 120 is shown as including a column of rotary blades connected to a backing. The backing can provide mechanical support to the rotary blades and achieve connection with the cutting arm 140. Additionally and/or alternatively, the backing can be integrated with any wires, pipes and/or tubes that supply hydraulic and/or electric power for operating the rotary blades. Additionally and/or alternatively, the blade assembly 120 (shown in FIG. 6C) can include a belt of blades and/or chain of blades arranged in an elongated loop configured to revolve and/or rotate to cut limbs of the plants.

The cutting arm 140 is shown as being connected to a middle portion of the blade assembly 120, such that both end regions of the blade assembly 120 can balance relative to the cutting arm 140. However, the cutting arm 140 can be connected to any selected portion of the blade assembly 120, without limitation.

For illustrative purpose only, the standing member 110 and the blade assembly 120 are shown as being vertical to the ground, and the cutting arm 140 is shown as being parallel to the ground. Thus, when the cutting arm 140 swings about the pivot point region 180, the blade assembly 120 trims the hedge 200 along a pruning surface 222 vertical to the ground. The pruning surface 222 is shown as being curved and having a height equal to, or similar to, the length of the blade assembly 120. The curved plane 222 intersects with a top surface of the hedge 200 at the arc 220. Stated somewhat differently, the system 100 can vertically prune individual trees selected within a given row.

In other examples (not shown), the standing member 110 and the blade assembly 120 are not necessarily vertical to the ground and/or the cutting arm 140 is not necessarily parallel to the ground. Thus, the pruning surface 222 can be orientated in any other suitable manner, without limitation.

Figure 4C:
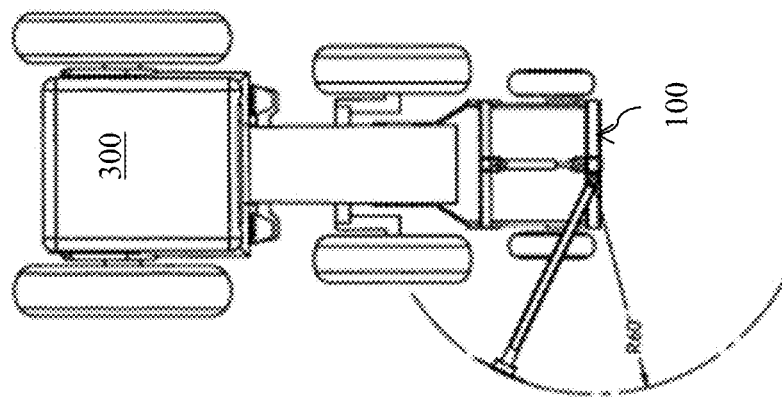
FIGS. 4A-4C are exemplary detail drawings illustrating a side view, a perspective view, and a top view, respectively, of the system of FIG. 3.
Figure 4A:
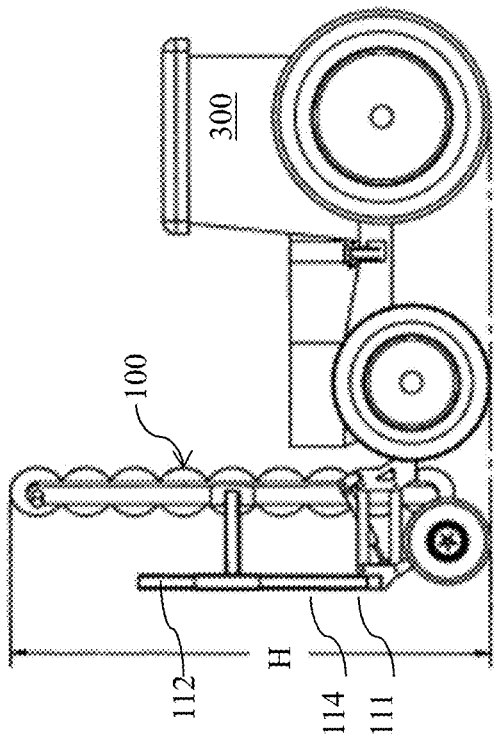
Figure 4B:
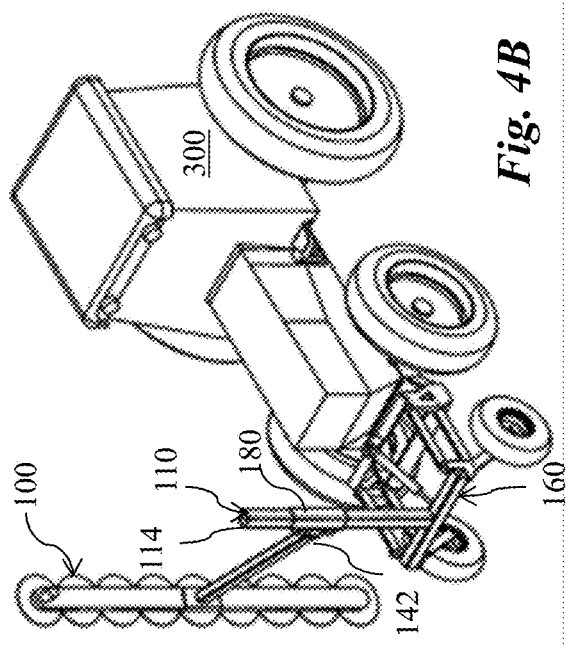

Alternative views of the system 100 as set forth in FIG. 3 are shown in FIGS. 4A-4C.

Figure 5:
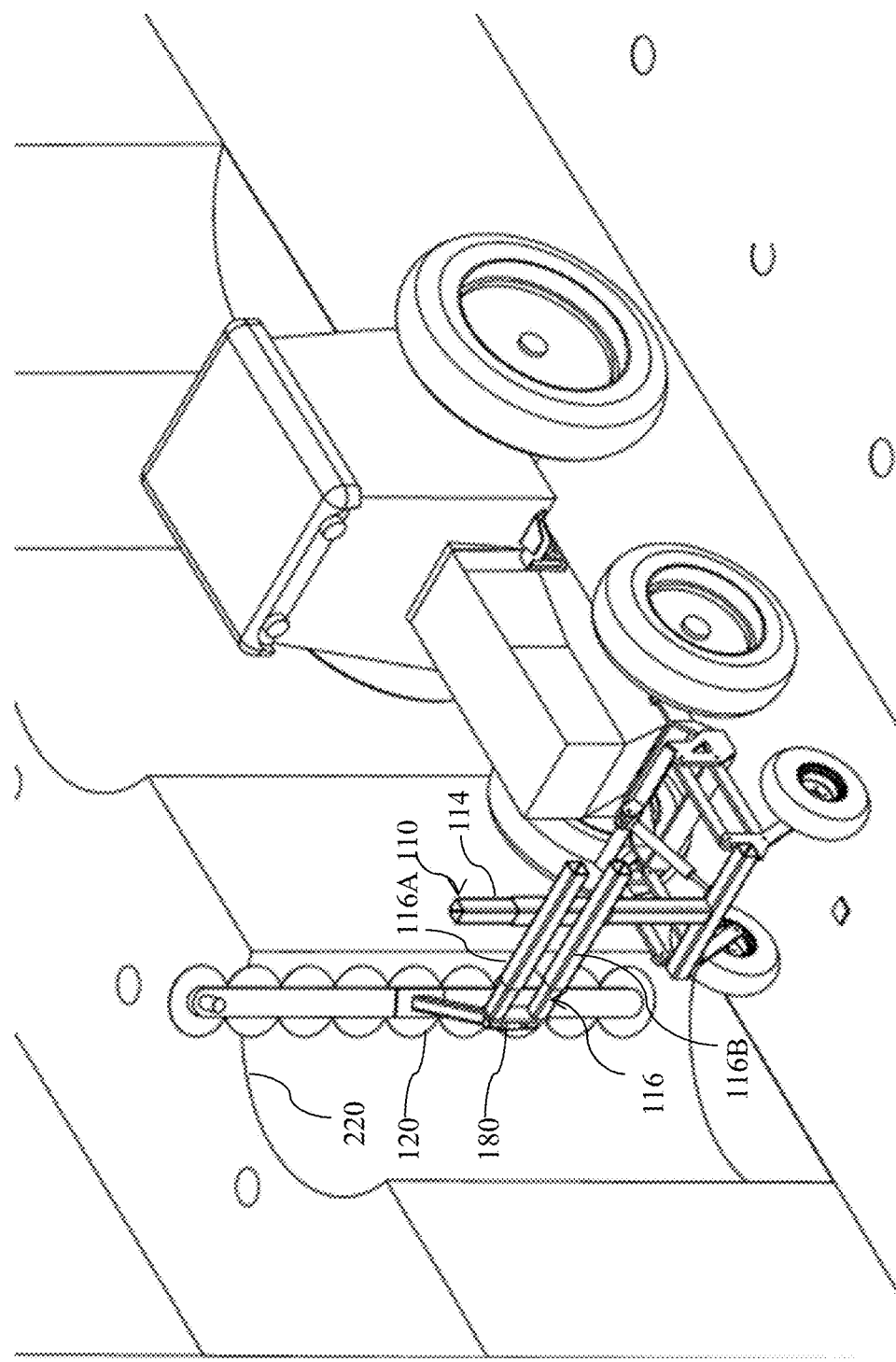
FIG. 5 is a detail drawing illustrating another exemplary embodiment of the system of FIG. 1, wherein the system includes an extension member.

Turning to FIG. 5, the standing member is shown as further including an extension member 116 between the pivot point region 180 and the elongated body 114. The extension member 116 can include any structure that joins the pivot point region 180, and/or the cutting arm 140, with the elongated body 114, such that the pivot point region 180 can be positioned at a selected distance from the elongated body 114. Thus, the length of the cutting arm 140 can be shorter than the distance between the elongated body 114 and the blade assembly 120. Advantageously, shape of the arc 220 can be further customized. For example, even if the standing member 110 is not very close to the hedge 200, the system 100 can prune with a short cutting arm 140 when the arc 220 of a small radius of curvature is suitable for a plant. Stated somewhat differently, in one example (shown in FIG. 6D), by using the extension member 116, the radius of the arc 220 can reduce from r1 to r2.

The extension member 116 is shown as including two elongated bodies 116A, 116B that are parallel and coupled to the cutting arm 140 by the pivot point region 180. However, any other suitable structures can be used for making the extension member 116, without limitation.

A length of the extension member 116 can be adjusted. The elongated bodies 116A, 116B are shown as having a telescopic pipe structure (or a structure including one or more nested pipes). In another example, the selected portion can have one or more pipe sleeves that can be inserted into the elongated bodies 116A, 116B for lengthening the elongated bodies 116A, 116B. In one embodiment, the length of the extension member 116 can be adjusted manually by an operator. Additionally and/or alternatively, the length of the extension member 116 can be adjusted in an automated manner or robotically by using hydraulic and/or electrical power and optionally under computer control. Advantageously, pruning can be further finely adjusted and individualized for each plant. Optionally, the position of the extension member 116 on the elongated body 114 can be adjusted such that height of the cutting arm 140, for example, can be adjusted.

Alternative views of the system 100 as set forth in FIG. 5 are shown in FIGS. 6A-6D. FIG. 6A indicates the system 100 as having the height of H and the blade assembly 120 as having a length of H2.

Figure 7:
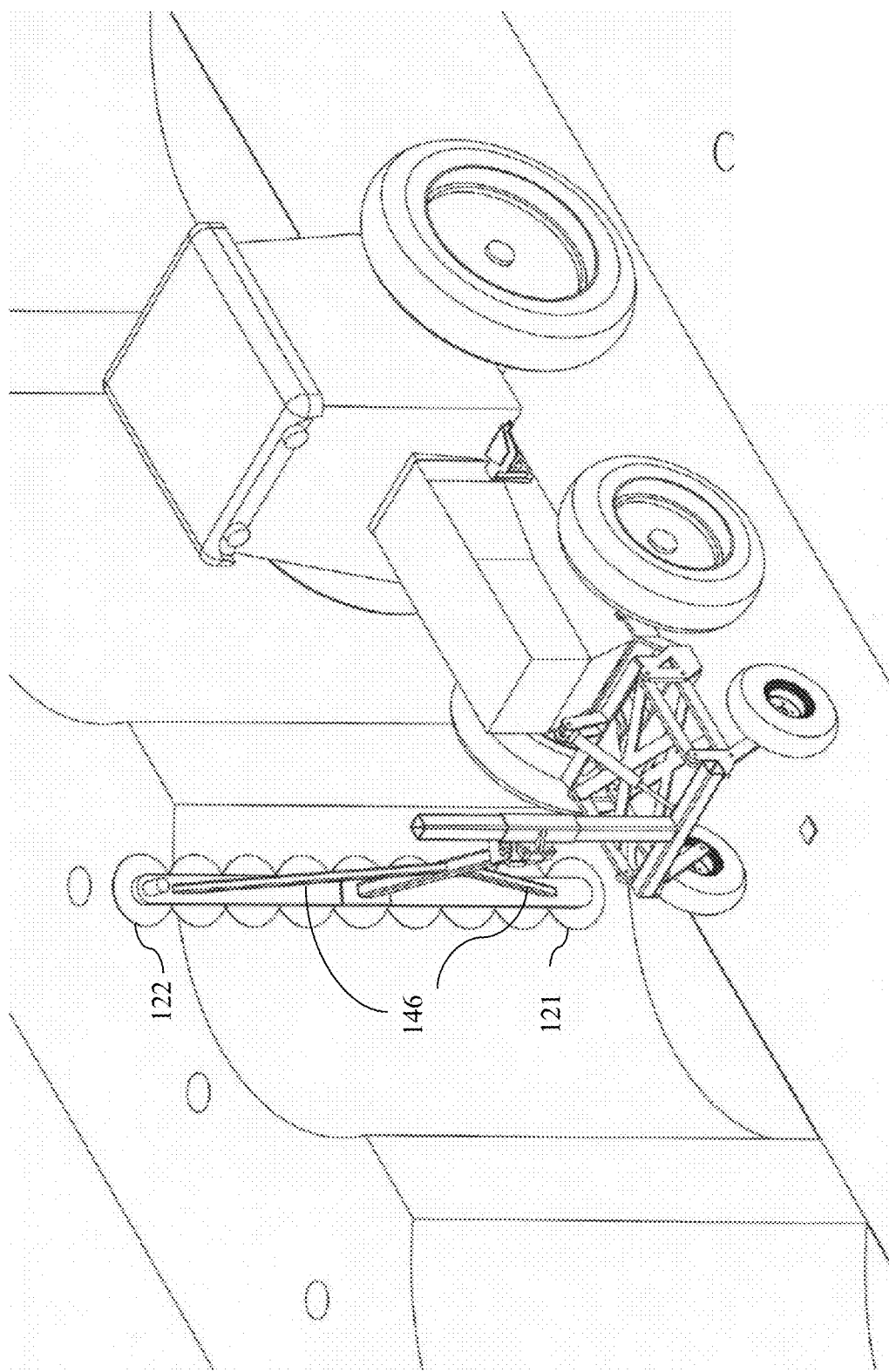
FIG. 7 is a detail drawing illustrating another exemplary embodiment of the system of FIG. 1, wherein the system includes a cutting arm and one or more support members connected to the cutting arm.
Figure 8:
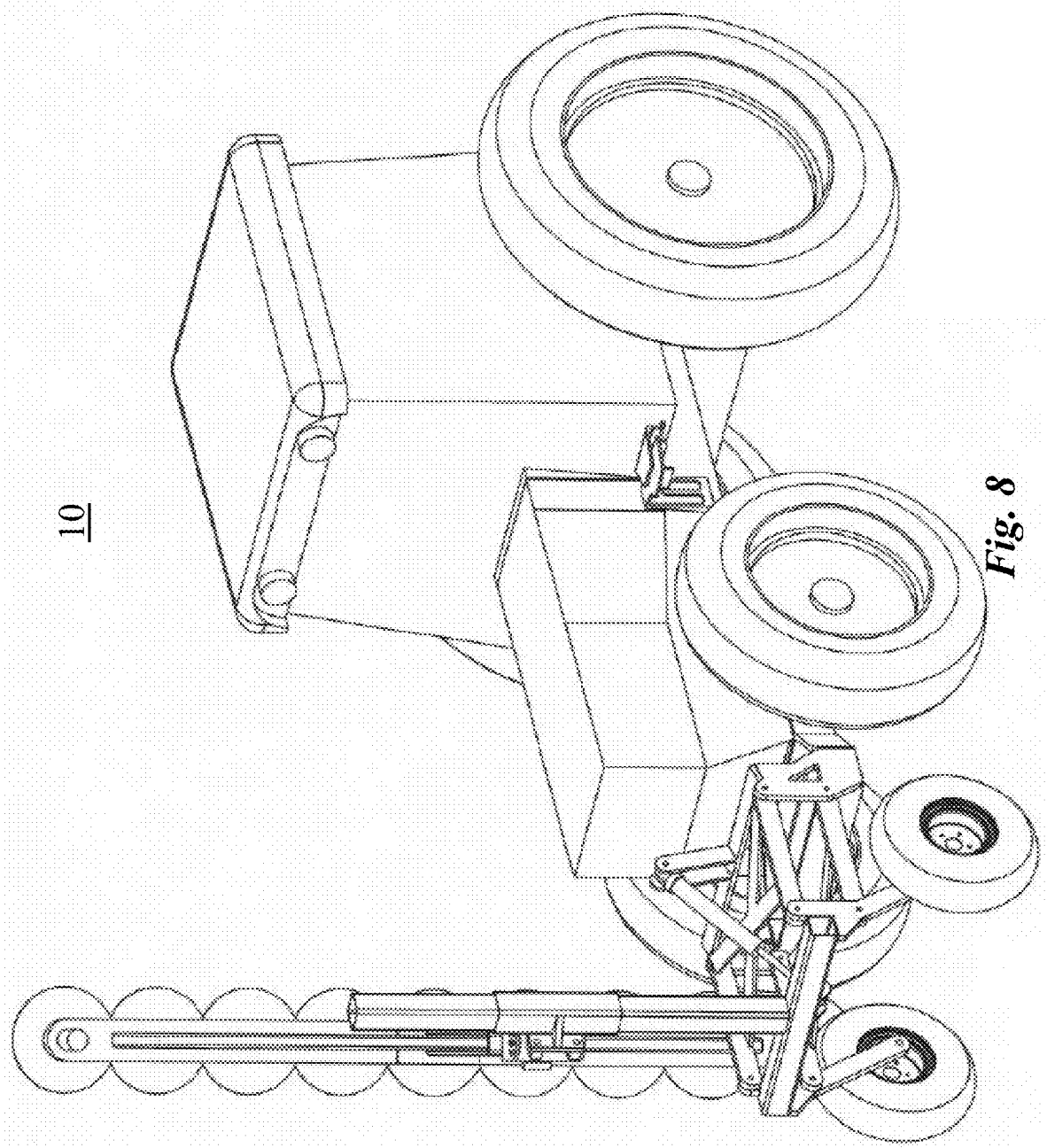
FIG. 8 is a detail drawing illustrating the system of FIG. 7, wherein the cutting arm rotates to an alternative position.

Turning to FIG. 7, the system 100 is shown as further including two support members 146, each having an elongated shape and extending from an end region of the blade assembly 120 to a selected portion of cutting arm 140. Stated somewhat differently, the two support members 146 are respectively connected to two end regions (for first and second end regions) 121, 122 of the blade assembly 120. The selected portion can be the second end portion 142, and/or any other portion(s), of the cutting arm 140. Advantageously, the two support members 146 can strengthen connection between the cutting arm 140 and the blade assembly 120 and stabilize position of the blade assembly 120 during pruning.

Although FIG. 7 shows two support members 146 for illustrative purposes only, the system 100 can include one support member 146 or any number of support members 146 having uniform and/or different shapes and sizes, without limitation. Although FIG. 7 shows the support members 146 as being connected to the same portion of the cutting arm 140 for illustrative purposes only, the support members 146 can be connected to the same and/or different portions of the cutting arm 140, without limitation.

Alternative views of the system 100 as set forth in FIG. 7 are shown in FIGS. 8-11. FIG. 9A indicates the system 100 as having the height of H.

Figure 12:
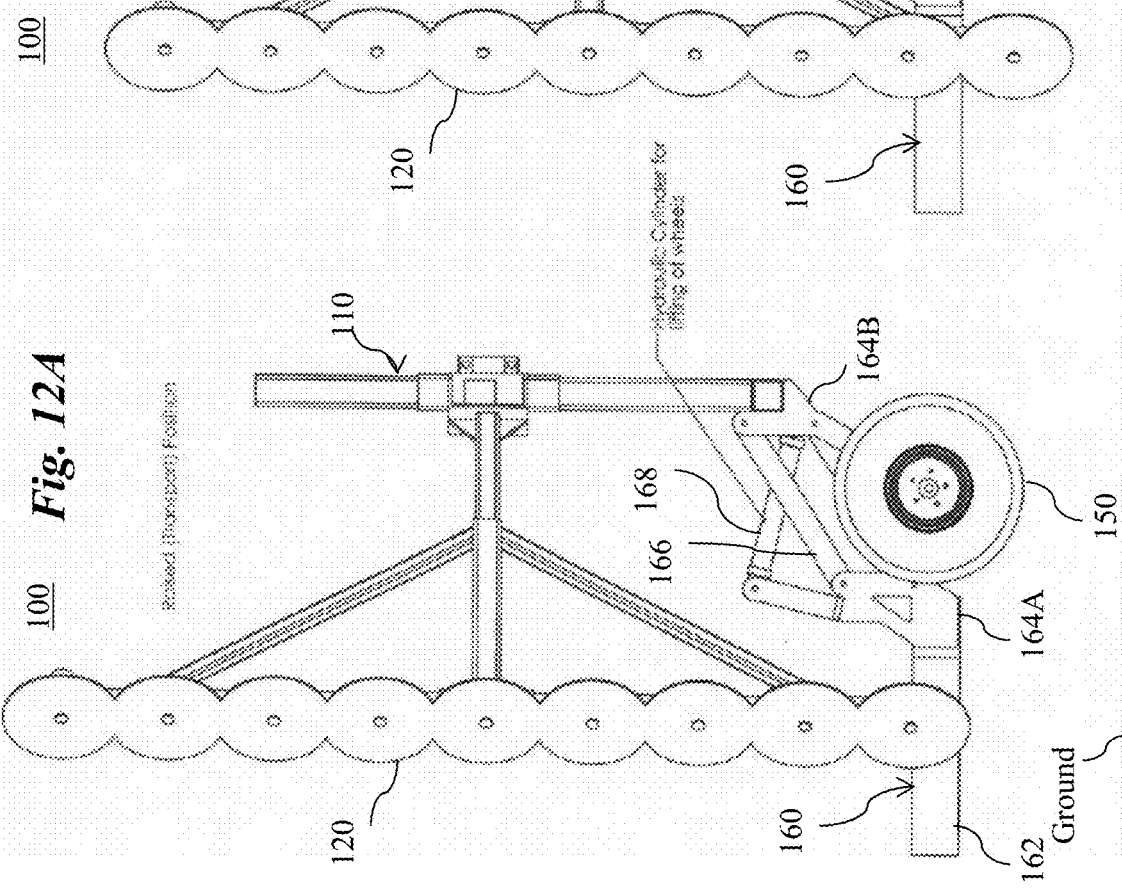
FIGS. 12A-12B are exemplary detail drawings illustrating a side view of the system of FIG. 7 in raised and lowered positions, respectively.

Turning to FIGS. 12A-12B, the mounting assembly 160 is shown as optionally including at least one wheel 150. The wheel 150 can be located at the bottom of the mounting assembly 160 during pruning and/or transportation and connected to the rest of the mounting assembly 160 via suitable mechanical connections. The wheel 150 is shown in FIG. 12A as being elevated from the ground in the raised position and in FIG. 12B as being contacting the ground in the lowered position. For example, the wheel 150 can be in the raised position during transport. Thus, even if the wheel 150 has limited turning capability, the wheel 150 does not limit traveling of the mobile platform 300 (shown in FIG. 1) during transport. The wheel 150 can be in the lowered position during pruning, such that the system 100 can be more stabilized.

The system 100 can include any number of uniform and/or different wheels 150. For example, the system 100 can include two wheels 150 (shown in FIG. 13), with one on each side.

The standing member 110 is shown as being fixedly coupled with the wheel 150. Stated somewhat differently, the standing member 110 and the wheel 150 can be raised and/or lowered simultaneously. The standing member 110 is shown in FIG. 12A as being in the raised position and in FIG. 12B as being in the lowered position. A distance between the standing member 110 and the ground is greater in the raised position than in the lowered position. The capability of conversion between the raised and the lowered positions can provide flexibility to the pruning. For example, the blade assembly 120 can prune at a selected height.

The mounting assembly 160 can be configured to adjust the height of the wheel 150 and/or the standing member 110 in any suitable manner. FIG. 12A shows the mounting assembly 160 as including a mounting framework 162 for connecting with the mobile platform 300. The mounting framework 162 can be joined with the mobile platform 300 via any suitable structure, such as cooperating detents. For example, when the mobile platform 300 includes the tractor, the tractor can include any conventional mounting structures for connecting to farming equipment, including the mounting assembly 160 as set forth above.

Figure 13:
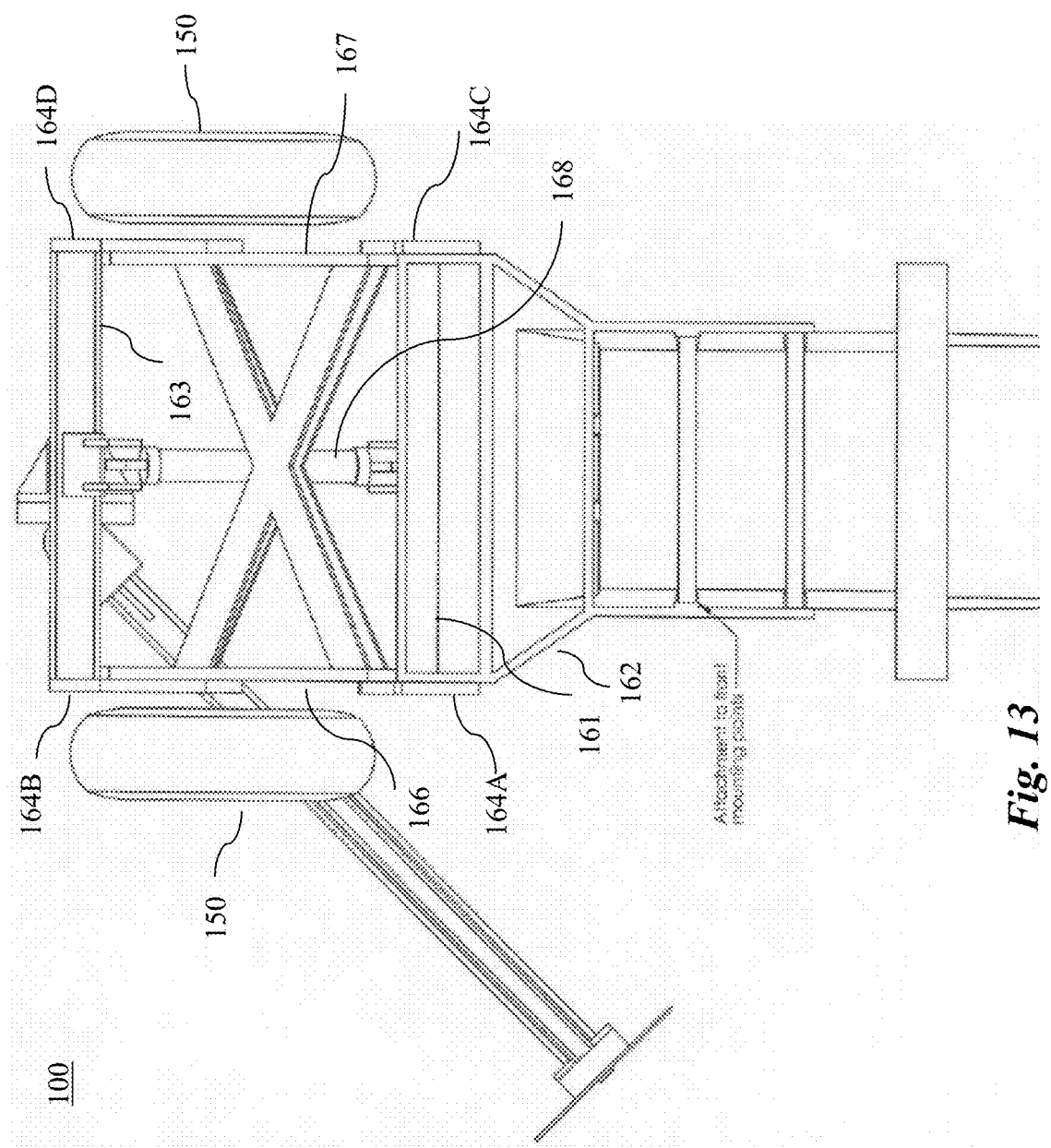
FIG. 13 is an exemplary detail drawing illustrating a bottom view of the system of FIG. 7, wherein a mounting framework of the system is shown.

FIG. 12A, viewed in conjunction with FIG. 13, shows the mounting assembly 160 as including a mounting bracket 164A fixedly connected to one side of the mounting framework 162 and a mounting bracket 164C (shown in FIG. 13) fixedly connected to the other side of the mounting framework 162 and oppositely positioned relative to the mounting bracket 164A. A cross bar 161 (shown in FIG. 13) is shown as spanning between the mounting brackets 164A, 164C and connected to the mounting framework 162. A joint member 168 can be fixedly coupled to the cross bar 161. The joint member 168 is shown as including two portions rotatably connected via a joint where rotation can be driven manually by an operator. Additionally and/or alternatively, the rotation can be driven in an automated manner or robotically by using hydraulic and/or electrical power and optionally under computer control.

The mounting assembly 160 is shown as including a linking member 166 as rotatably connected to the mounting bracket 164A and including a linking member 167 (shown in FIG. 13) as rotatably connected to the mounting bracket 164C. The linking member 166 is shown as including two parallel bars, but can include any other types of structures, without limitation.

FIG. 13 shows the mounting assembly 160 as including a mounting bracket 164B rotatably connected to the linking member 166, and including a mounting bracket 164D that is rotatably connected to the linking member 167 and oppositely positioned relative to the mounting bracket 164B. A cross bar 163 is shown as spanning between, and connected to, the mounting brackets 164B, 164D. The joint member 168 is shown as being rotatably coupled to the cross bar 163 such that the joint member 168 spans between the cross bars 161, 163. The wheel 150 can be fixedly connected to the mounting brackets 164B, 164D. Thus, the joint member 168 can lift and/raise the cross bar 163 and accordingly lift and/raise the wheel 150.

In other embodiments (not shown), the standing member 110 is not necessarily fixedly coupled with the wheel 150. Stated somewhat differently, the standing member 110 and the wheel 150 can be separately raised and/or lowered. Additionally and/or alternatively, the standing member 110 can remain stationary and the wheel 150 is raised or lowered. Additionally and/or alternatively, the standing member 110 can be raised or lowered, and the wheel 150 remains stationery.

Figure 14:
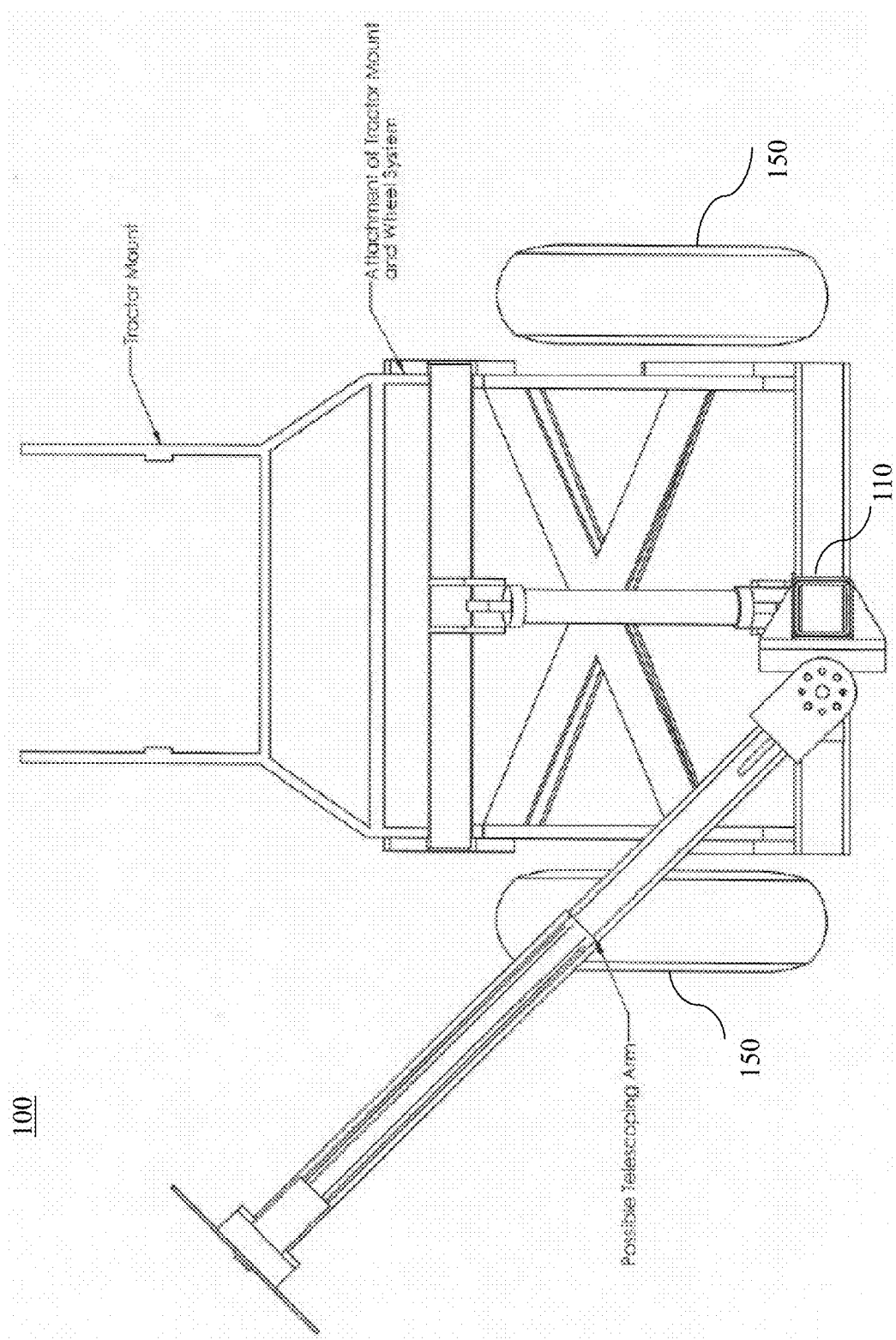
FIG. 14 is an exemplary detail drawing illustrating a top view of the system of FIG. 7, wherein a joint member of the system is shown.

Alternative views of the mounting assembly 160 as set forth in FIGS. 12A, 12B are shown in FIGS. 13-14.

Figure 15:
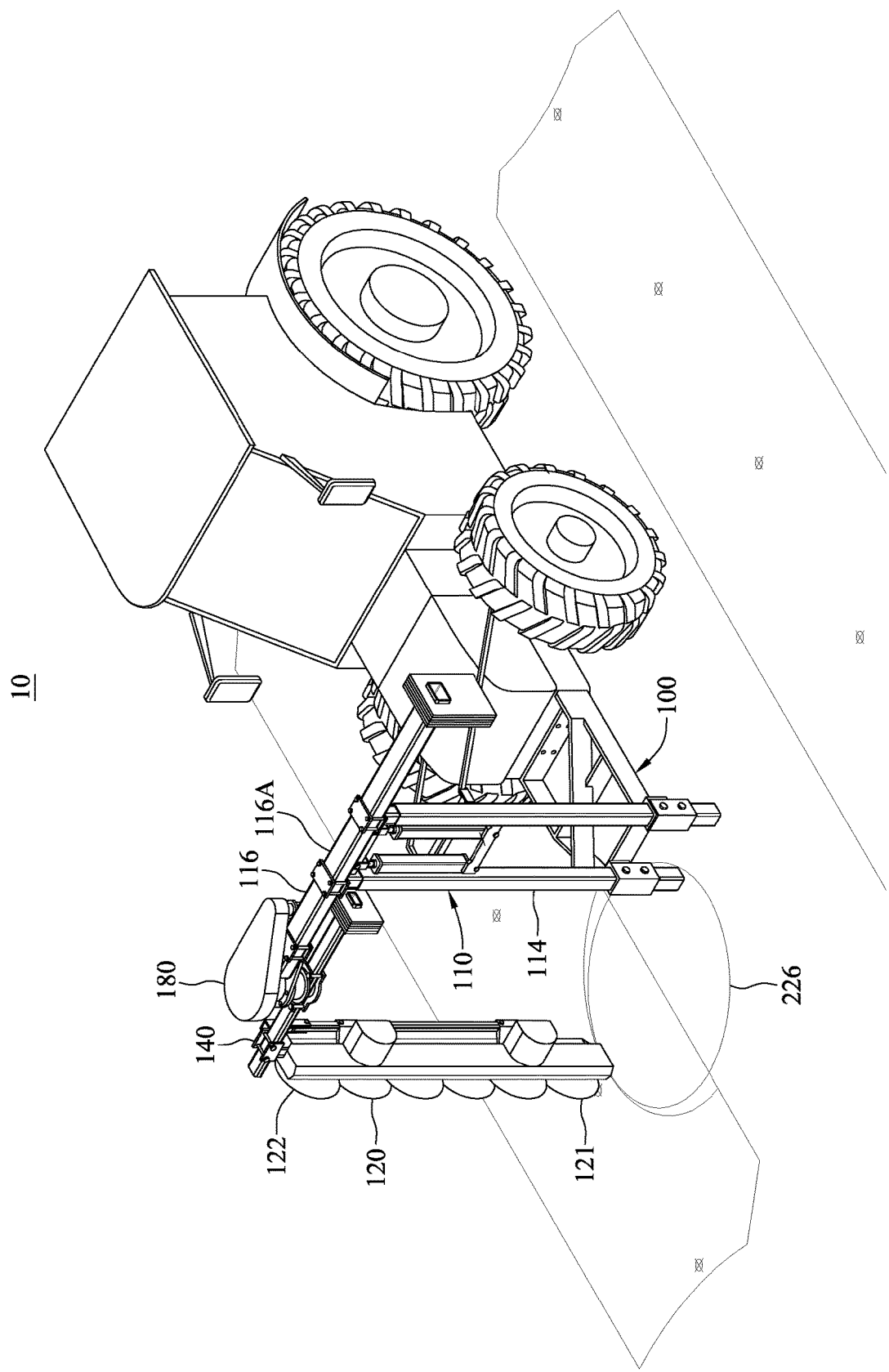
FIG. 15 is a detail drawing illustrating another exemplary embodiment of the system of FIG. 1.

Turning to FIG. 15, the extension member 116 is shown as including one elongated body 116A that is parallel to and coupled with the cutting arm 140 at the pivot point region 180. During operation of the system 100, at the pivot point region 180, the extension member 116 and the cutting arm 140 are positioned distal from and proximal to the ground, respectively. Stated somewhat differently, the extension member 116 is located above the cutting arm 140. The end regions 121, 122 of the blade assembly 120 are proximal to and distal to the ground, respectively. The cutting arm 140 is shown as being connected to the blade assembly 120 at the end region 122. Advantageously, when the cutting arm 140 rotates by a full circle about the pivot point region 180, the blade assembly 120 is not obstructed by the extension member 116.

Additionally and/or alternatively, a distance between the pivot point region 180 and the standing member 110 is shown as being greater than a radius of rotation of the blade assembly 120. Thus, when the cutting arm 140 rotates by a full circle about the pivot point region 180, the blade assembly 120 is not obstructed by the standing member 110.

Therefore, the cutting arm 140 can rotate by a full circle about the pivot point region 180, as indicated by a projection 226 on the ground. The projection 226 shows the path traversed by the blade assembly 120 via the rotation. In one embodiment, each pruning operation (including forming the arc 220 shown in FIG. 1) can include rotating the cutting arm 140 by a full circle, such that the blade assembly 120 starts and stops and rotation at the same location. Advantageously, the range of motion of the blade assembly 120 can be maximized and pruning can be customized for each plant with great flexibility.

Figure 16:
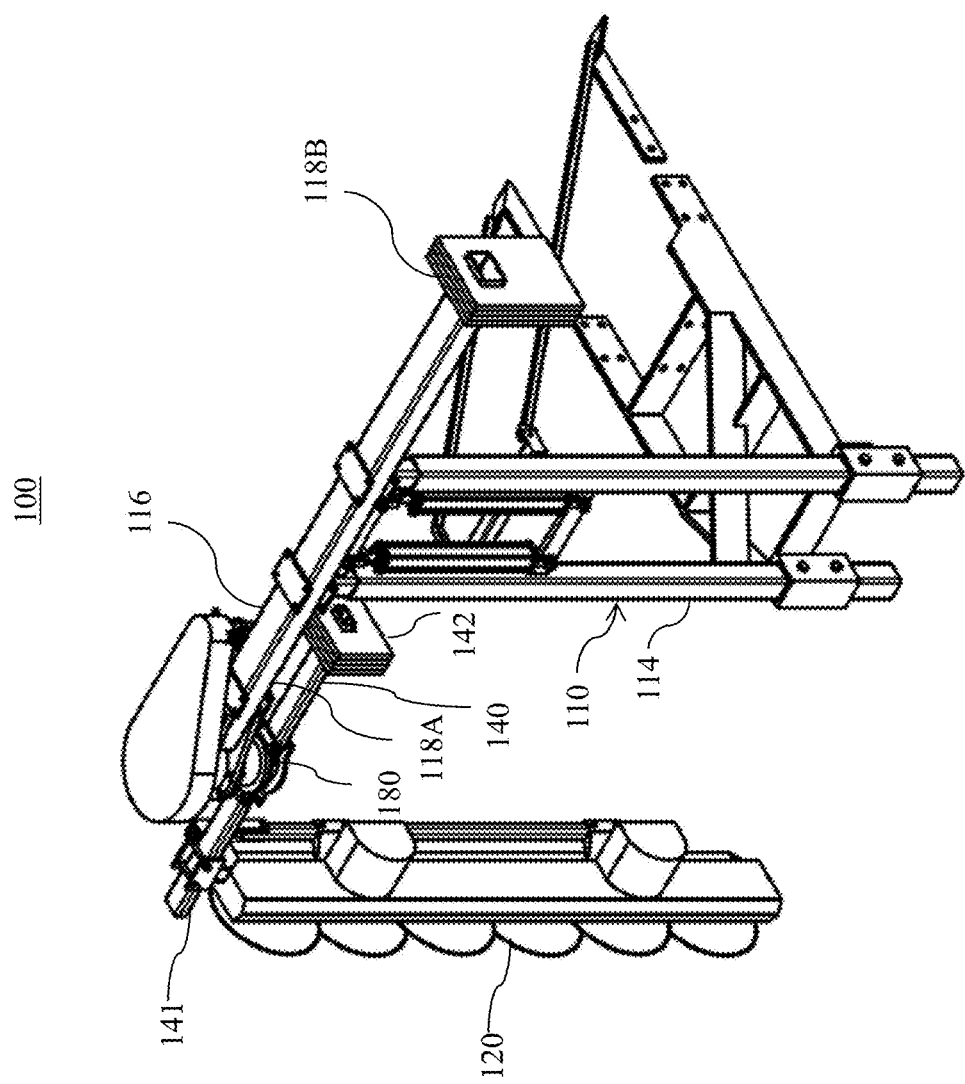
FIGS. 16-18 are exemplary detail drawings illustrating a perspective view, an alternative perspective view, and a side view, respectively, of the system of FIG. 15.

Turning to FIG. 16, the extension member 116 is shown as having two end regions 118A, 118B on either side of the system 100. The end region 118A is joined with the cutting arm 140 at the pivot point region 180. In one embodiment, the end regions 118A, 118B can each be joined with a cutting arm 140 at a pivot point region 180. The system 100 can thus operate two blade assemblies 120 and prune two hedges 200 (such as shown in FIG. 1) simultaneously. Advantageously, efficiency of pruning can be improved.

Additionally and/or alternatively, the cutting arm 140 has the end regions 141, 142 and can be coupled to the pivot point at a middle region of the cutting arm 140. The first end region 141 is shown as being connected to the blade assembly 120. In one embodiment, the end regions 141, 142 can each be connected to a blade assembly 120. Thus, each pruning operation can include rotating the cutting arm 140 by half a circle.

Figure 17:
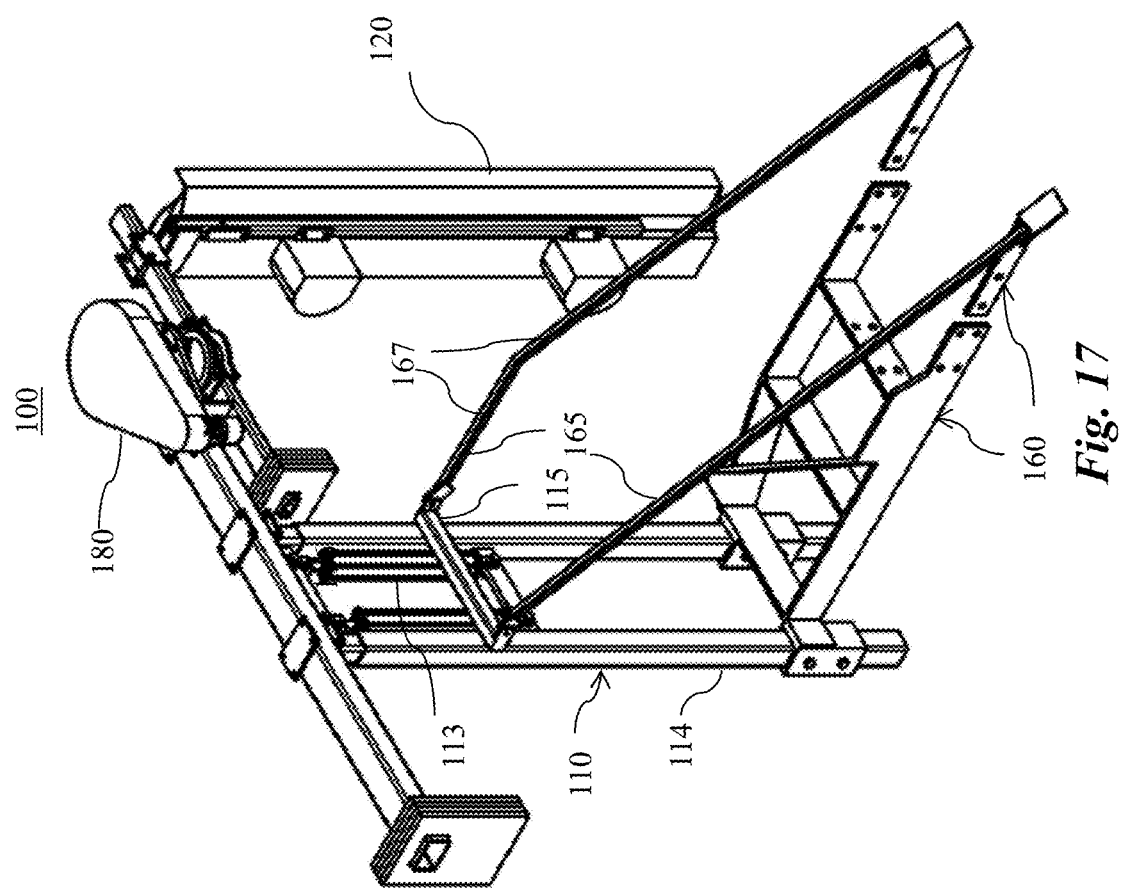

Turning to FIG. 17, the standing member 110 can include two elongated bodies 114 arranged in parallel. A length of each of the elongated bodies 114 can be adjusted by, for example, having a telescopic pipe structure. Advantageously, the height of the blade assembly 120 can be adjusted to provide pruning operation with more flexibility.

Figure 18:
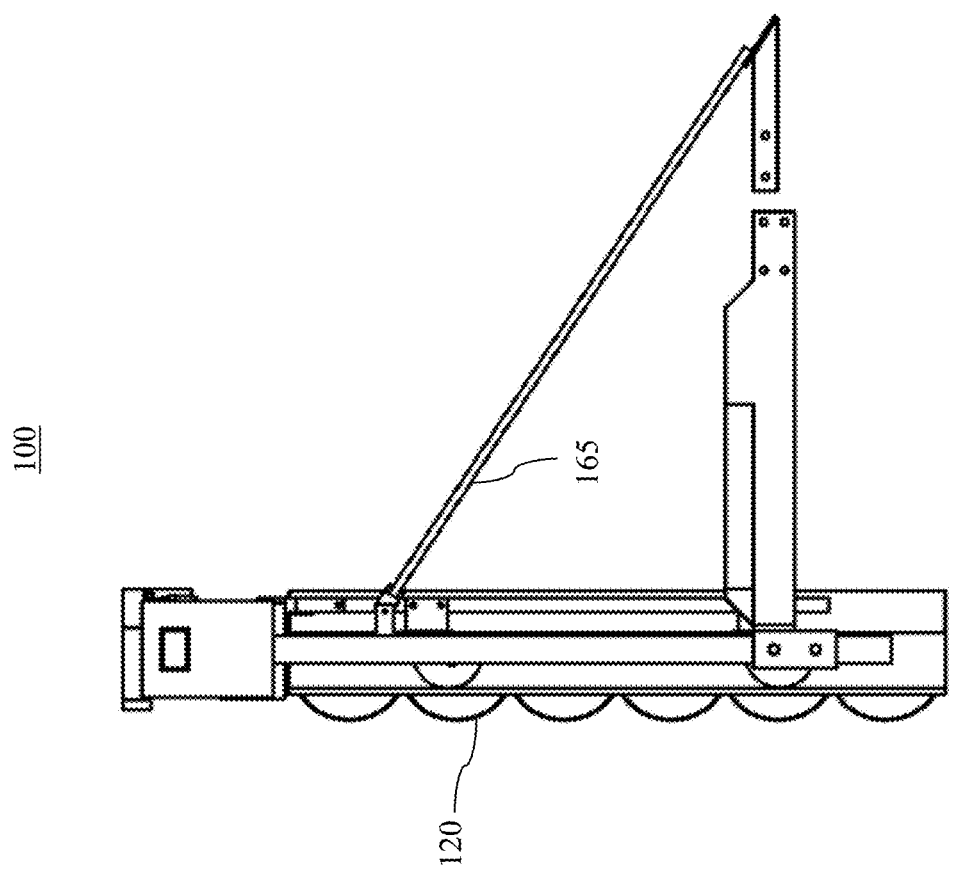

The system 100 is shown as including a pair of connectors 165 each extending from one of the elongated bodies 114 and to a region of the mounting assembly 160 that is coupled with the mobile platform 300 (shown in FIG. 1). The connectors 165 can be used optionally for accommodating and/or supporting cables, wires, pipes and/or tubes that supply hydraulic and/or electric power from the mobile platform 300 for operating the system 100. The connectors 165 are shown as connecting to a bar 115 therebetween. The bar 115 can be configured to slide along rails 113 each respectively fixed parallel to the elongated bodies 114. Each of the connectors 165 can include two portions 167 that can be rotatably joined. Thus, the portions 167 can be arranged such that the connector 165 forms a line (shown in FIG. 18). The portions 167 are shown in FIG. 17 as forming an angle that is other than 180 degrees such that the bar 115 can adjust to various heights along the elongated bodies 114.

Figure 19:
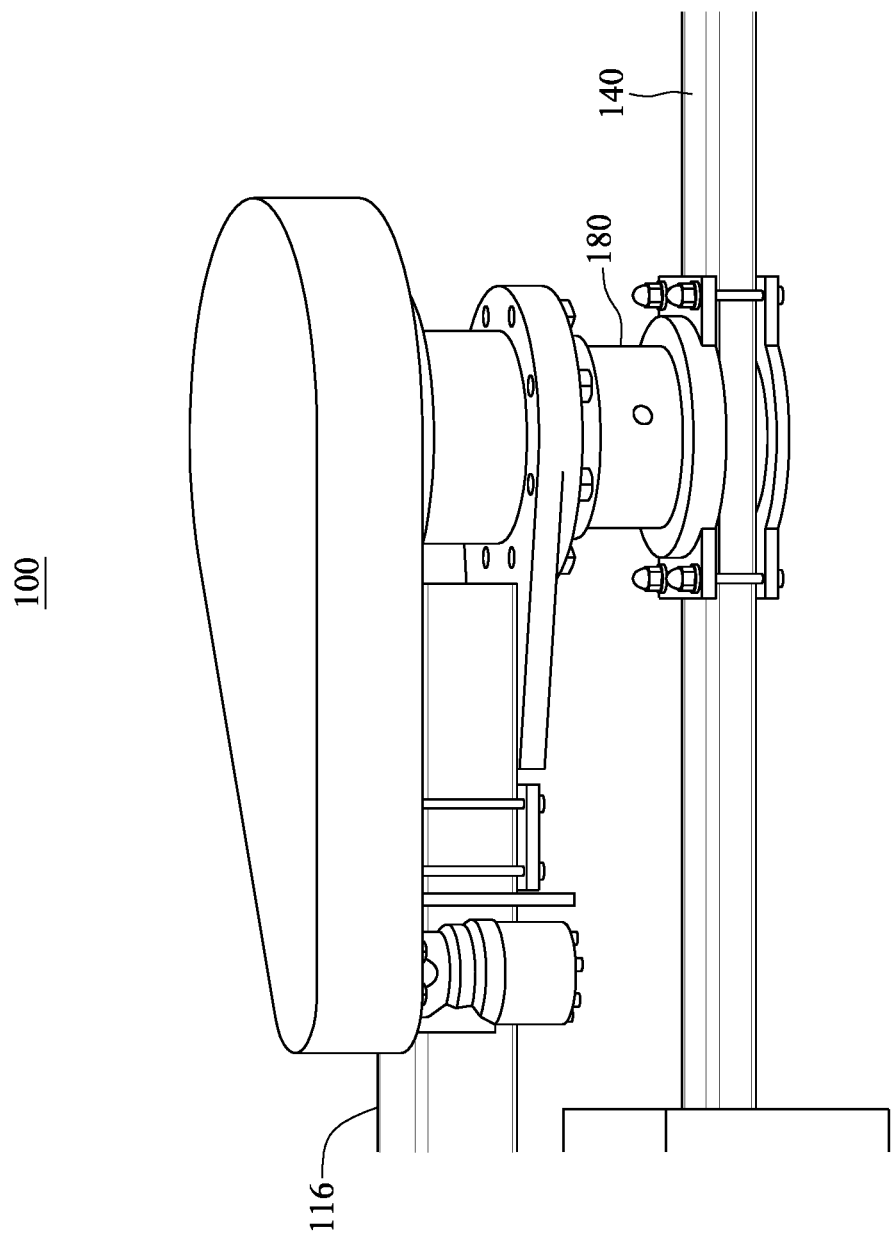
FIG. 19 is a detail drawing illustrating one exemplary embodiment of a pivot point region of the system of FIG. 15.
Figure 20:
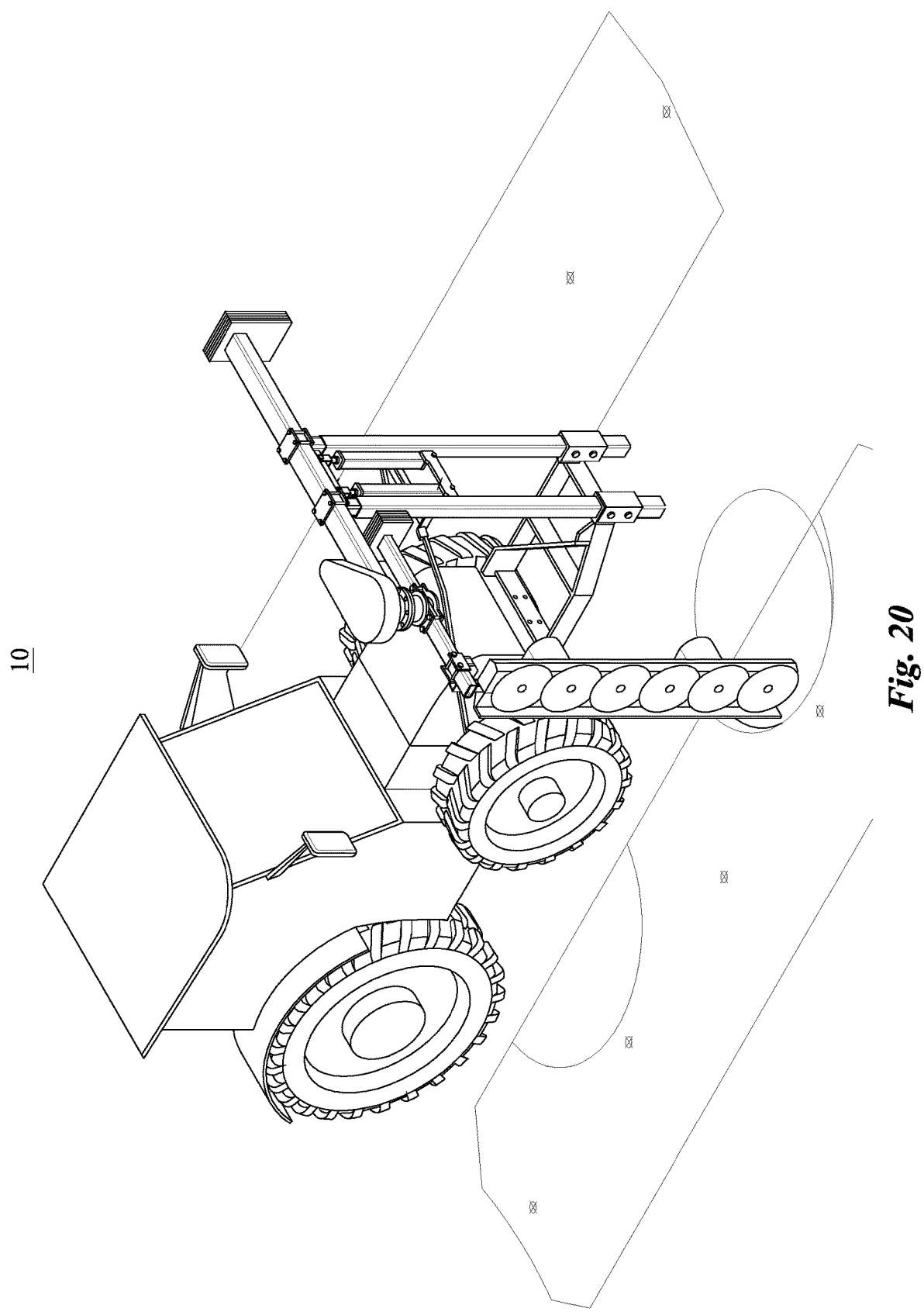
FIGS. 20-25 are detail drawings illustrating one exemplary embodiment of a perspective view, a side view, a top view, a front view, a back view, and an alternative top view, respectively, of the system of FIG. 15.
Figure 21:
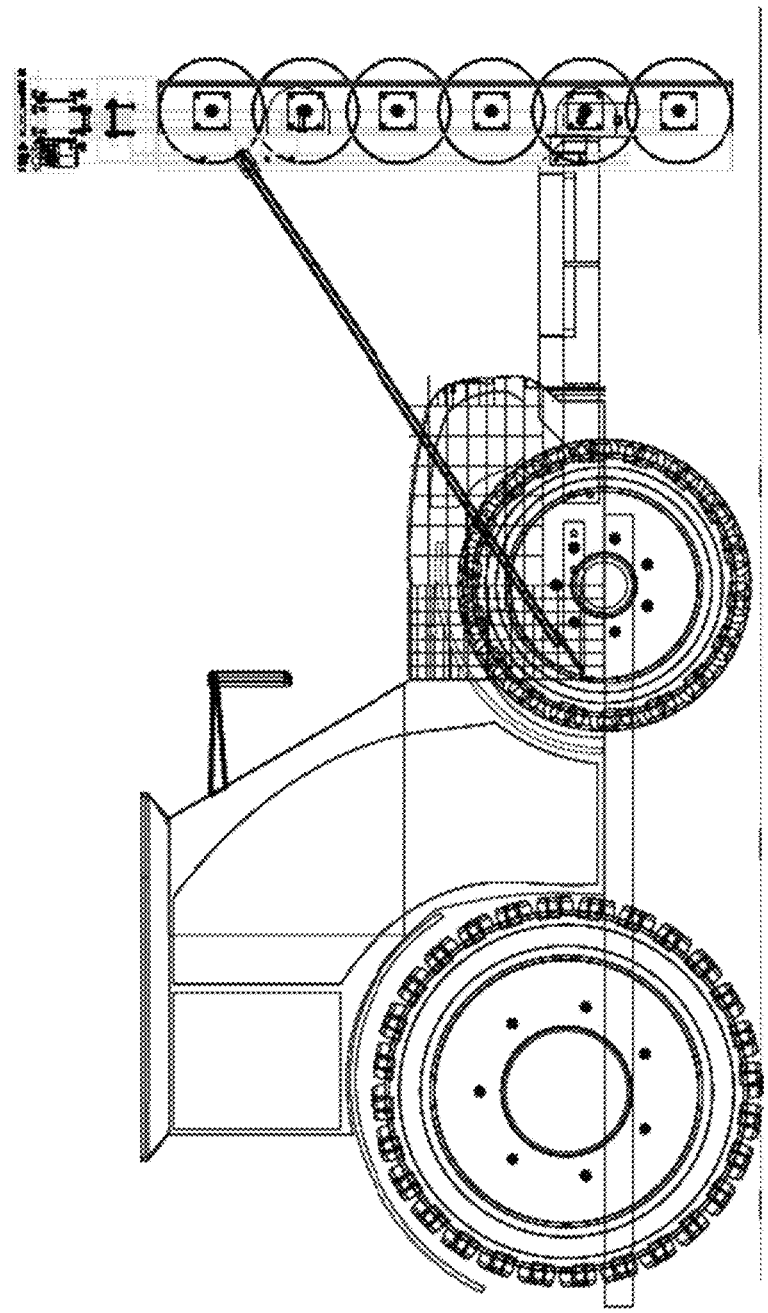
Figure 22:
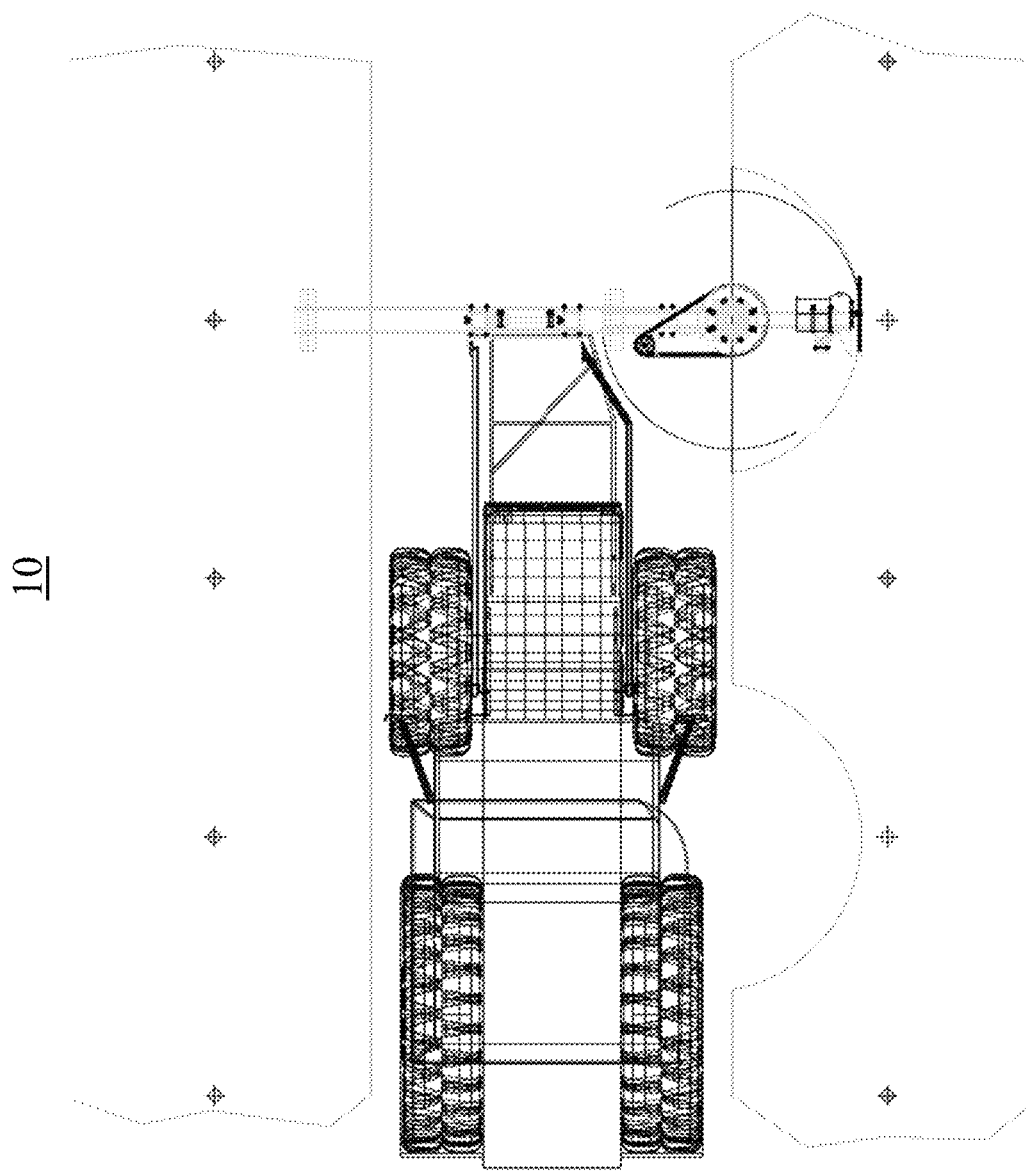
Figure 23:
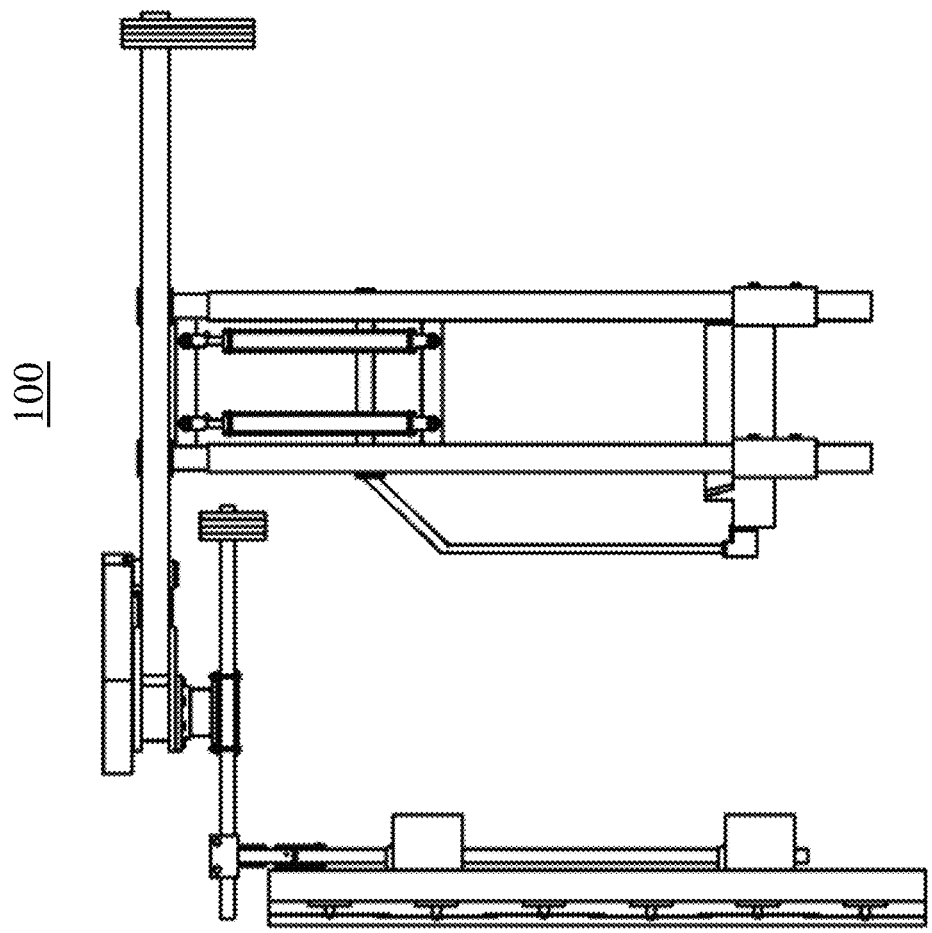
Figure 24:
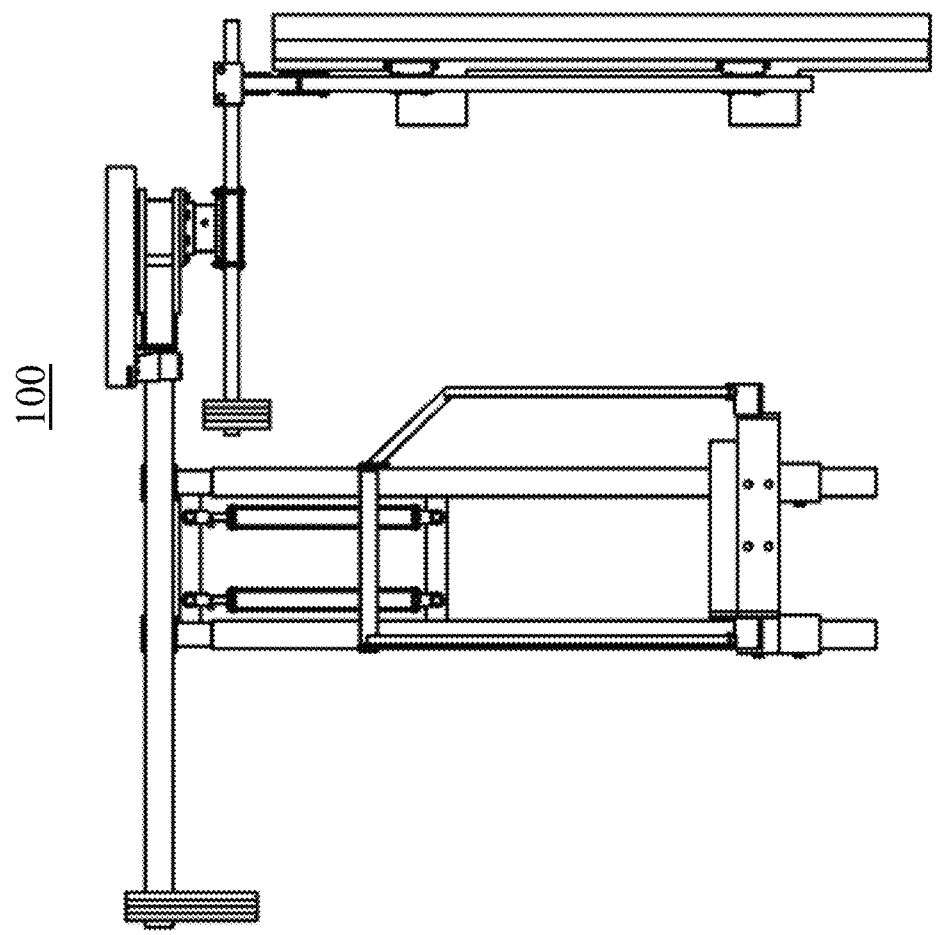
Figure 25:
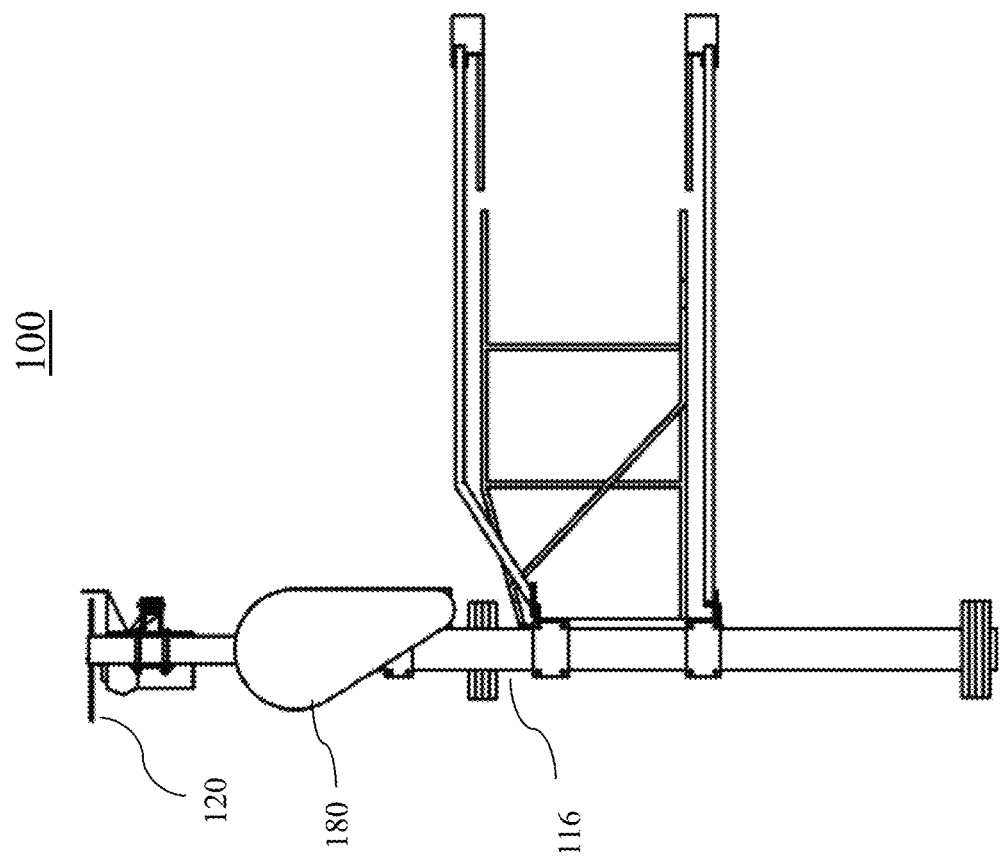

Turning to FIG. 19, the pivot point region 180 is shown in further detail. The pivot point region 180 can accommodate any suitable device for rotating the cutting arm 140. Exemplary device can include a pivoting motor, a rotary actuator, and/or the like.

Alternative views of the system 100 as set forth in FIG. 15 are shown in FIGS. 20-25.

Figure 26:
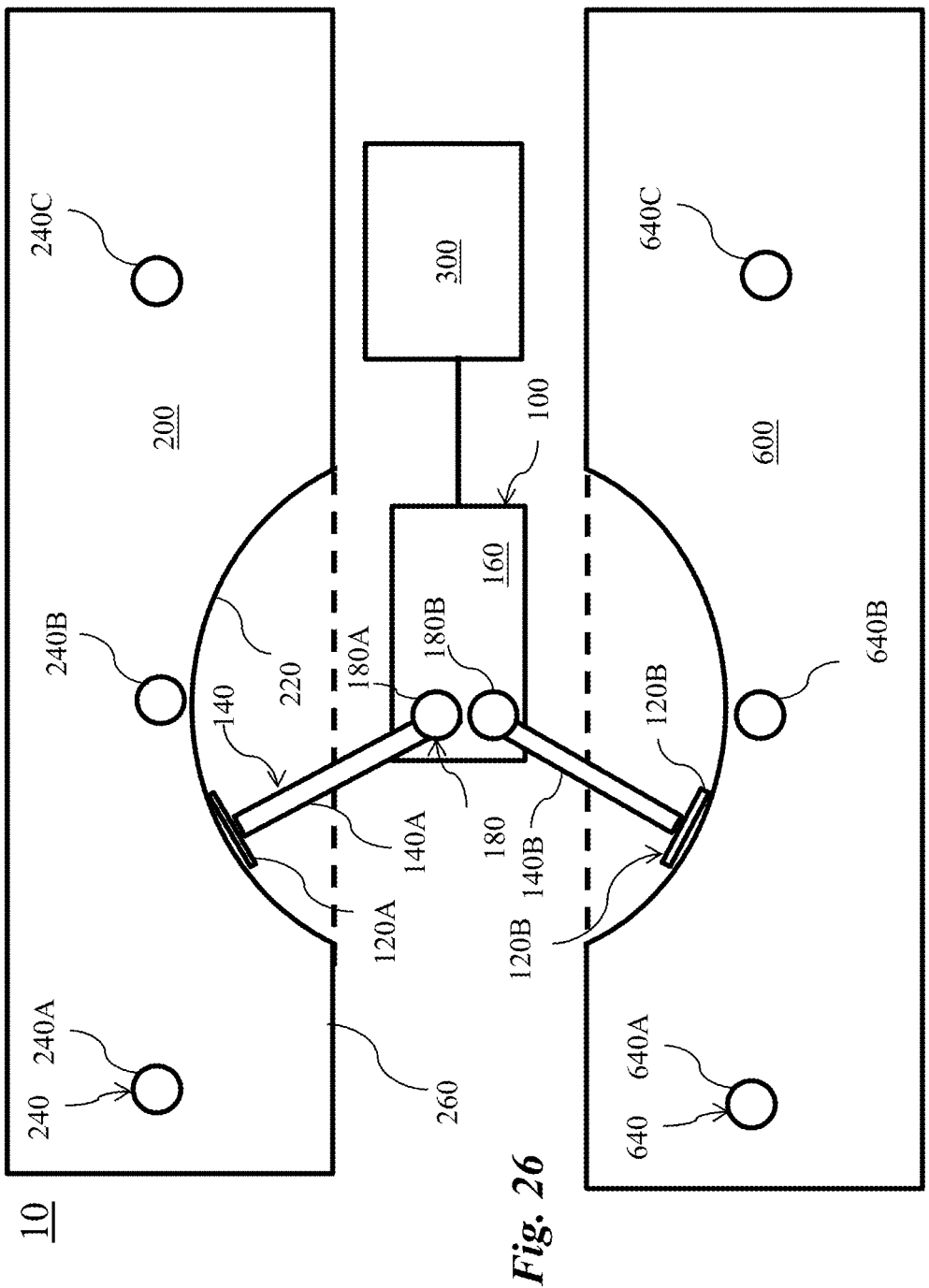
FIG. 26 is a diagram illustrating another exemplary embodiment of the system of FIG. 1, wherein the system includes two cutting arms.

Turning now to FIG. 26, the system 100 is shown as including two cutting arms 140 including cutting arms (or first and second cutting arms) 140A, 140B. The system 100 can include two blade assemblies 120 shown as blade assemblies (or first and second blade assemblies) 120A, 120B connected to the cutting arms 140A, 140B, respectively. The mounting assembly 160 can define two pivot point regions 180 shown as pivot point regions (or first and second pivot point regions) 180A, 180B rotatably connected to the cutting arms 140A, 140B, respectively.

The cutting arms 140A, 140B can each rotate about the pivot point regions 180A, 180B, respectively. The mobile platform 300 is shown as being located between two adjacent hedges 200, 600. The blade assemblies 120A, 120B can prune the hedges 200, 600, respectively. Advantageously, two hedges can be pruned at uniform and/or different times with the mobile platform 300 making one stop, improving pruning efficiency.

Although FIG. 26 shows the system 100 as having two cutting arms 140 for trimming two hedges on opposite sides of the system 100, the system 100 can include any number of uniform and/or different cutting arms 140 for trimming a single hedge, or any number of uniform and/or different hedges oriented in any suitable manner relative to the system 100, without limitation. Similarly, FIG. 26 shows the system 100 as defining two pivot point regions 180 each connected to one cutting arm 140 for illustrative purposes only. However, the system 100 can define one pivot point region 180 or any number of uniform and/or different pivot point regions 180, and each pivot point region 180 can be connected to any number of uniform and/or different cutting arms 140, without limitation.

Figure 27:
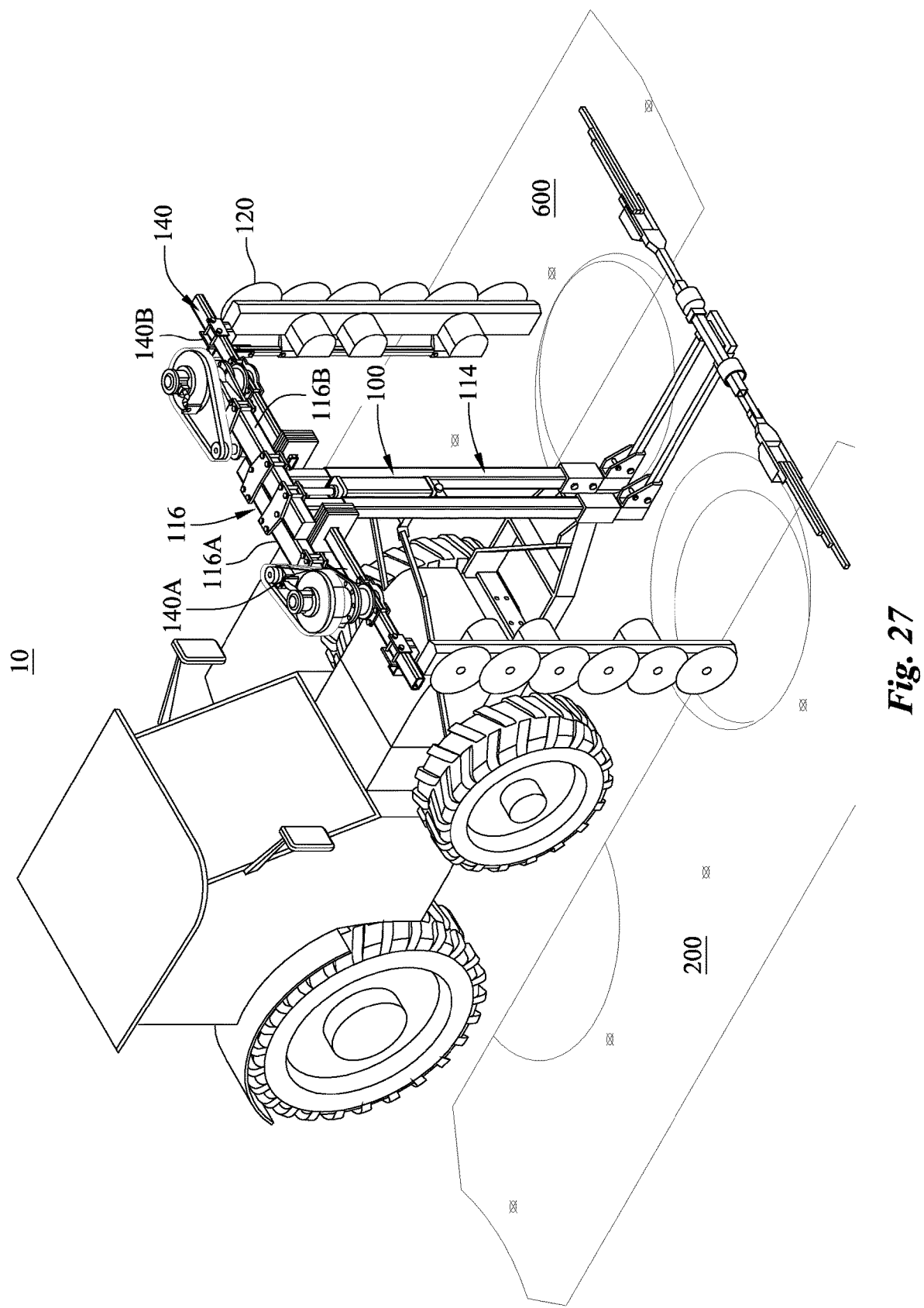
FIG. 27 is an exemplary detail drawing illustrating the system of FIG. 26.
Figure 28:
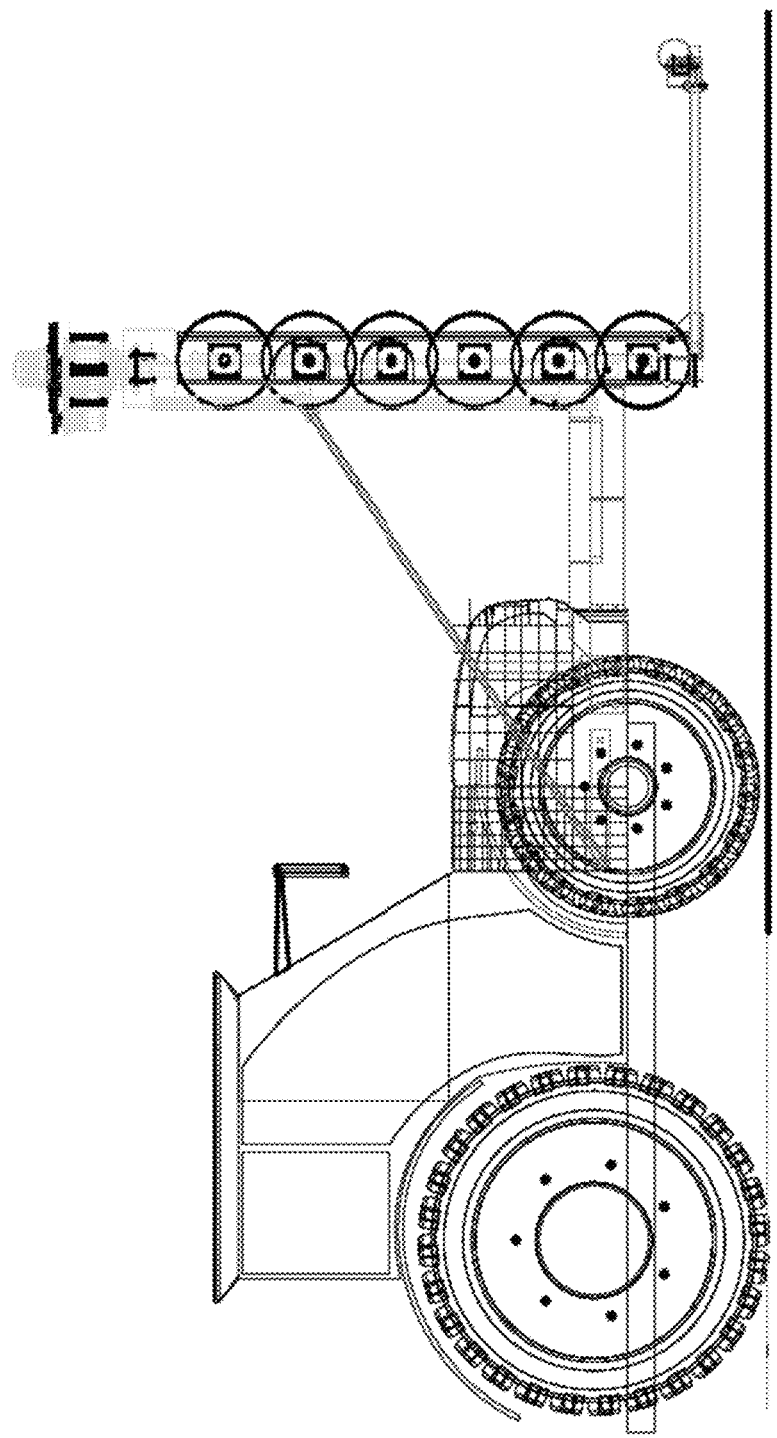
FIGS. 28-30 are exemplary detail drawings illustrating a perspective view, a side view, a top view and an alternative perspective view, respectively, of the system of FIG. 27, wherein the system is connected to a mobile platform.
Figure 29:
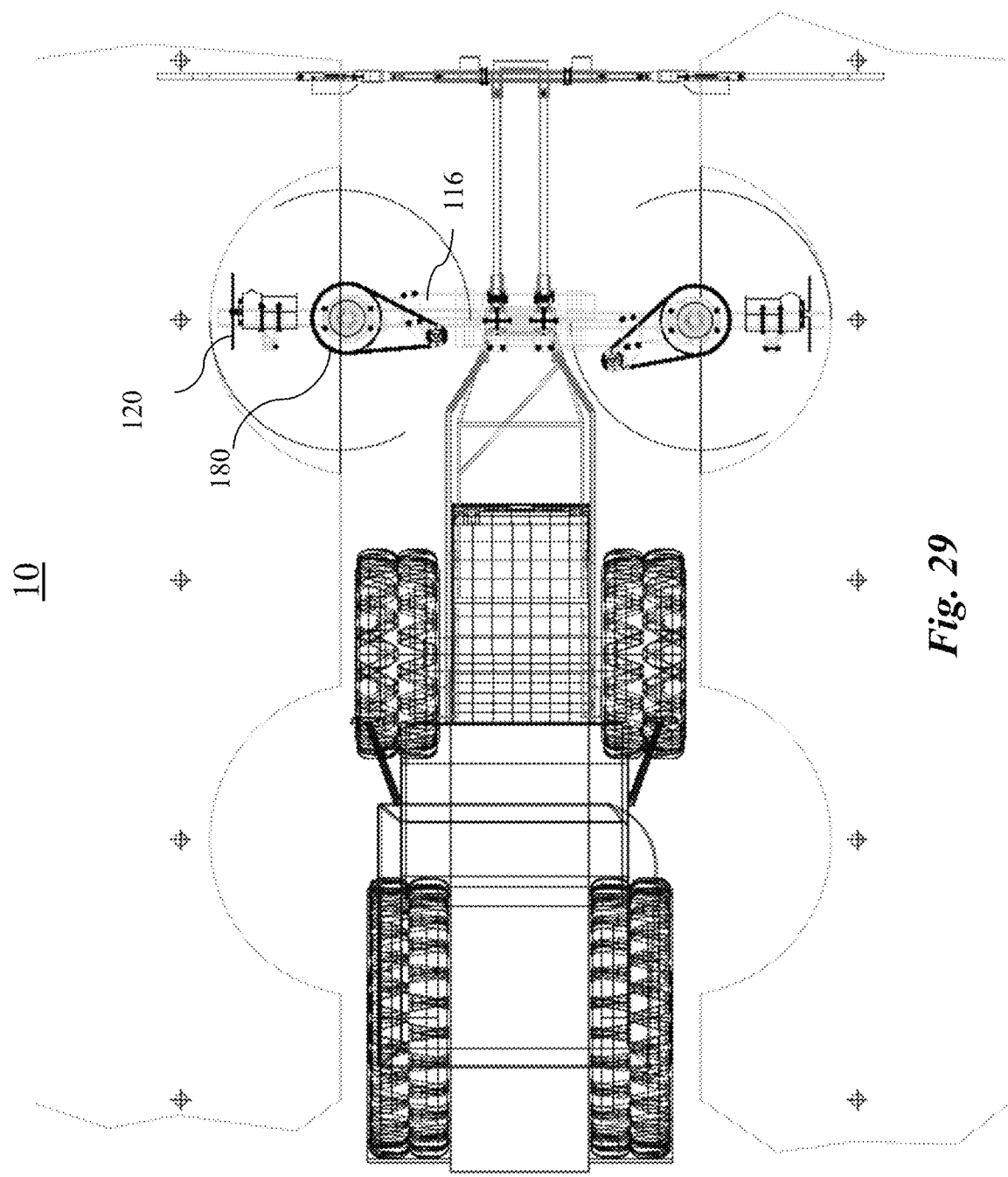
Figure 30:
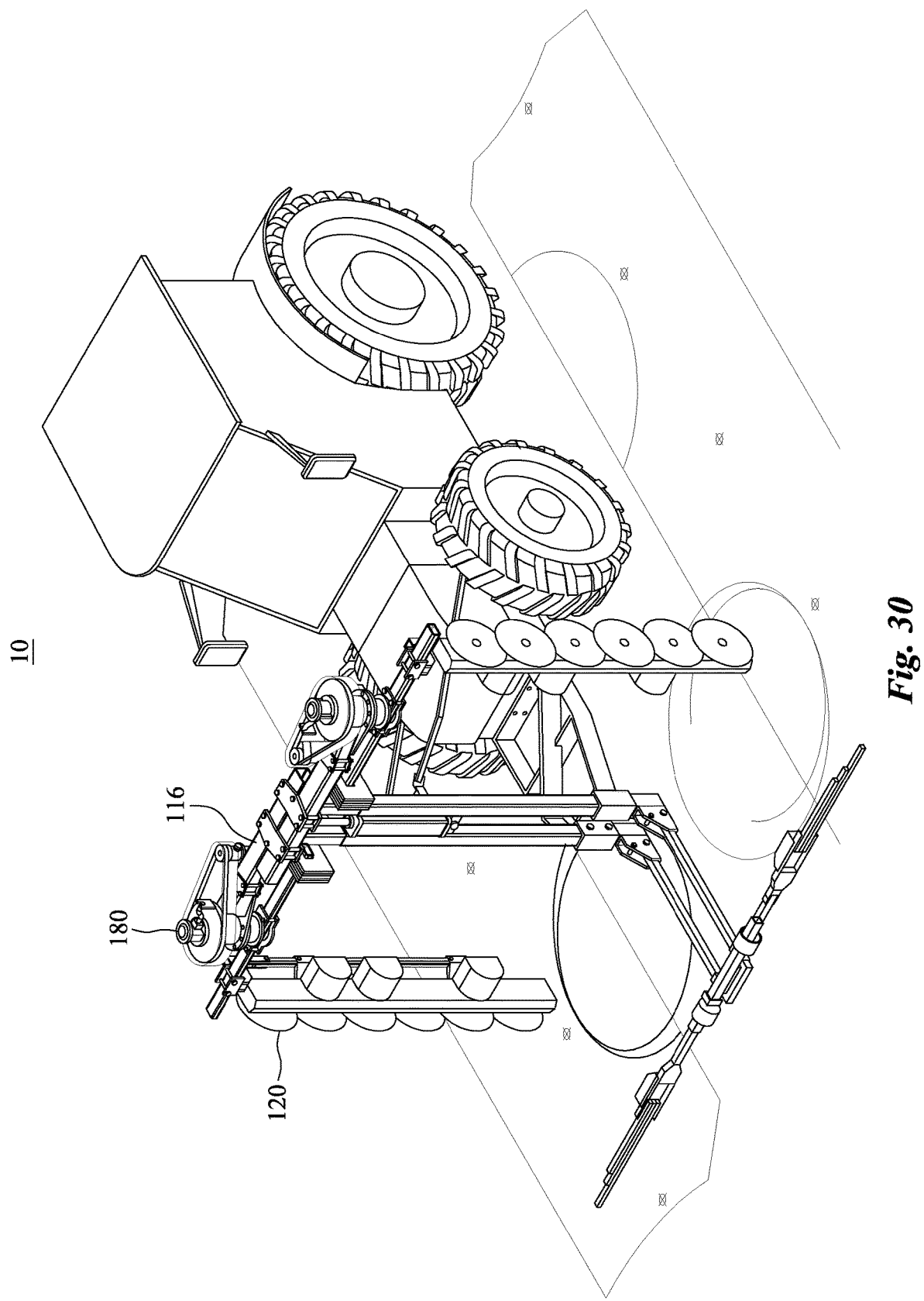
Figure 31:
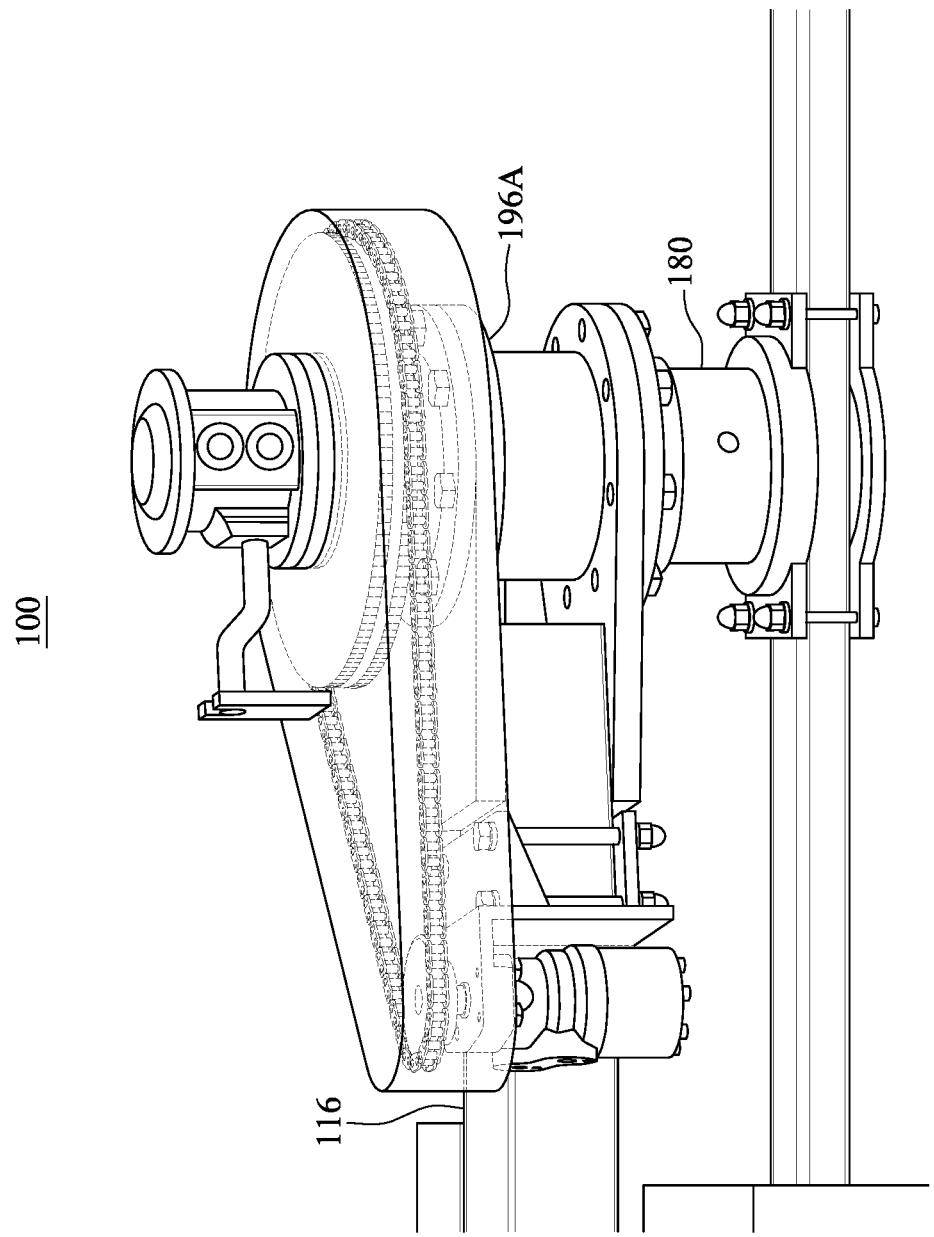
FIG. 31 is a detail drawing illustrating one exemplary embodiment of a pivot point region of the system of FIG. 27.
Figure 32:
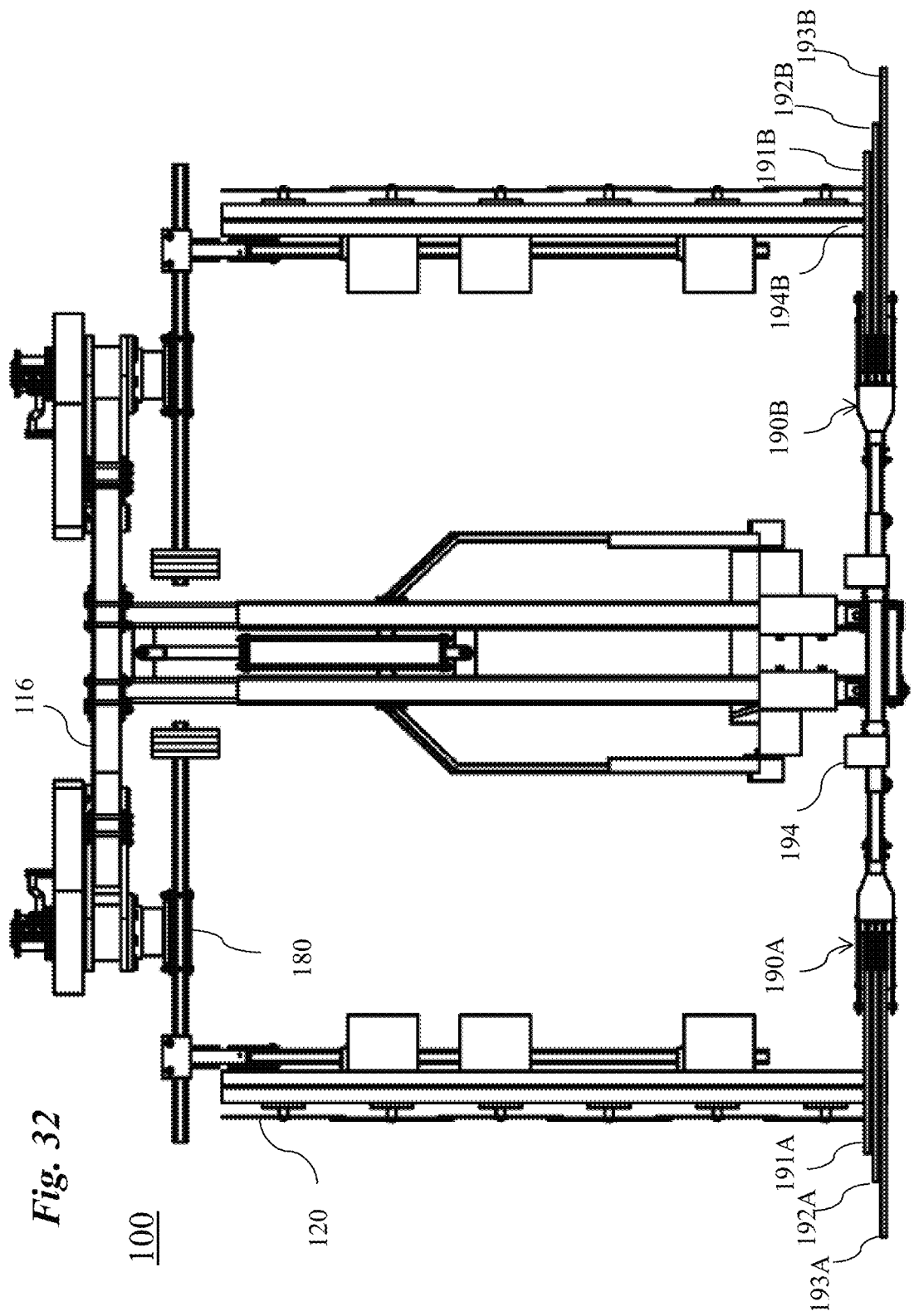
FIGS. 32-37 are exemplary detail drawings illustrating a front view, a back view, a side view, a top view, a back view, and two perspective views, respectively, of the system of FIG. 27.
Figure 33:
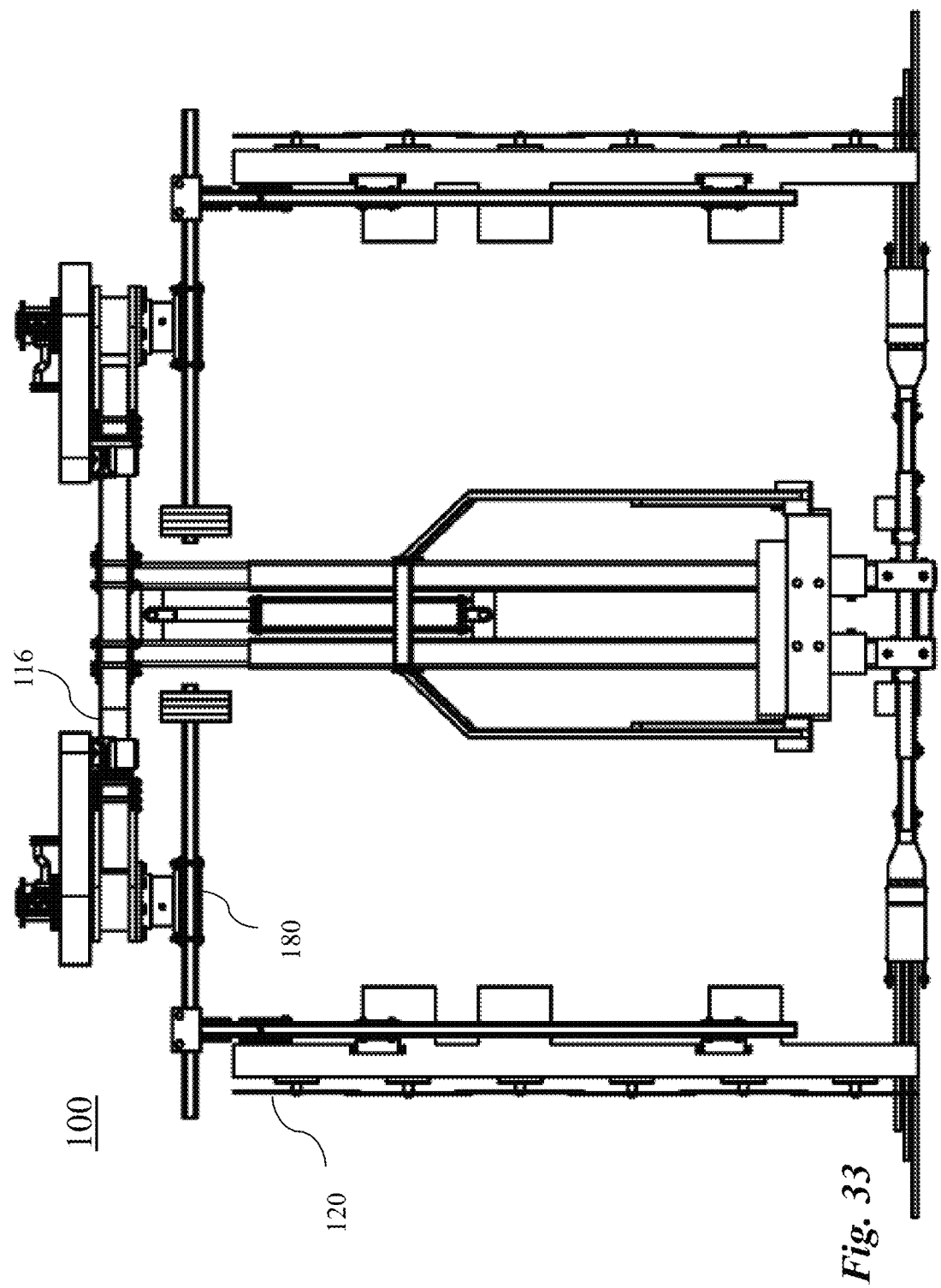
Figure 34:
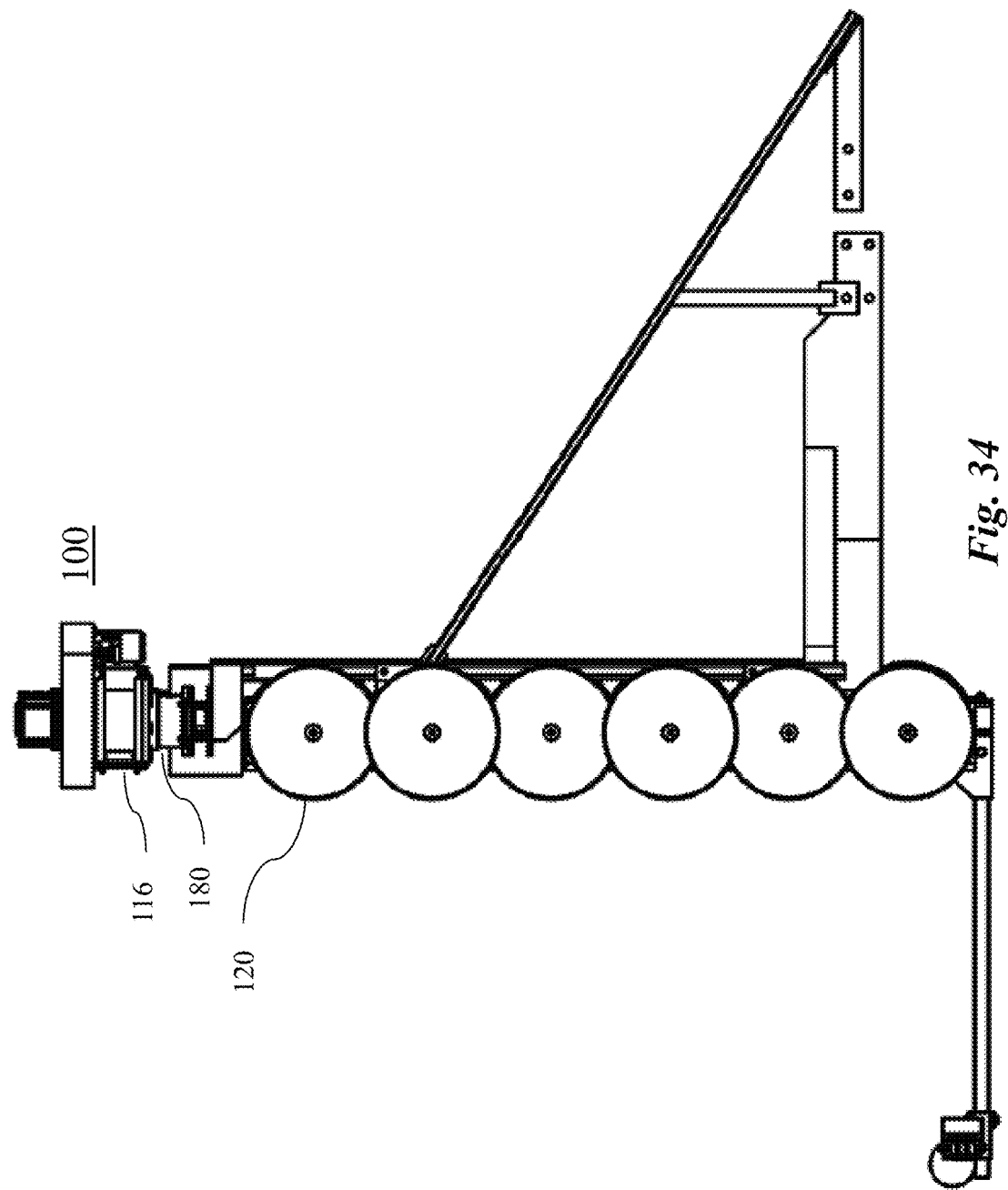
Figure 35:
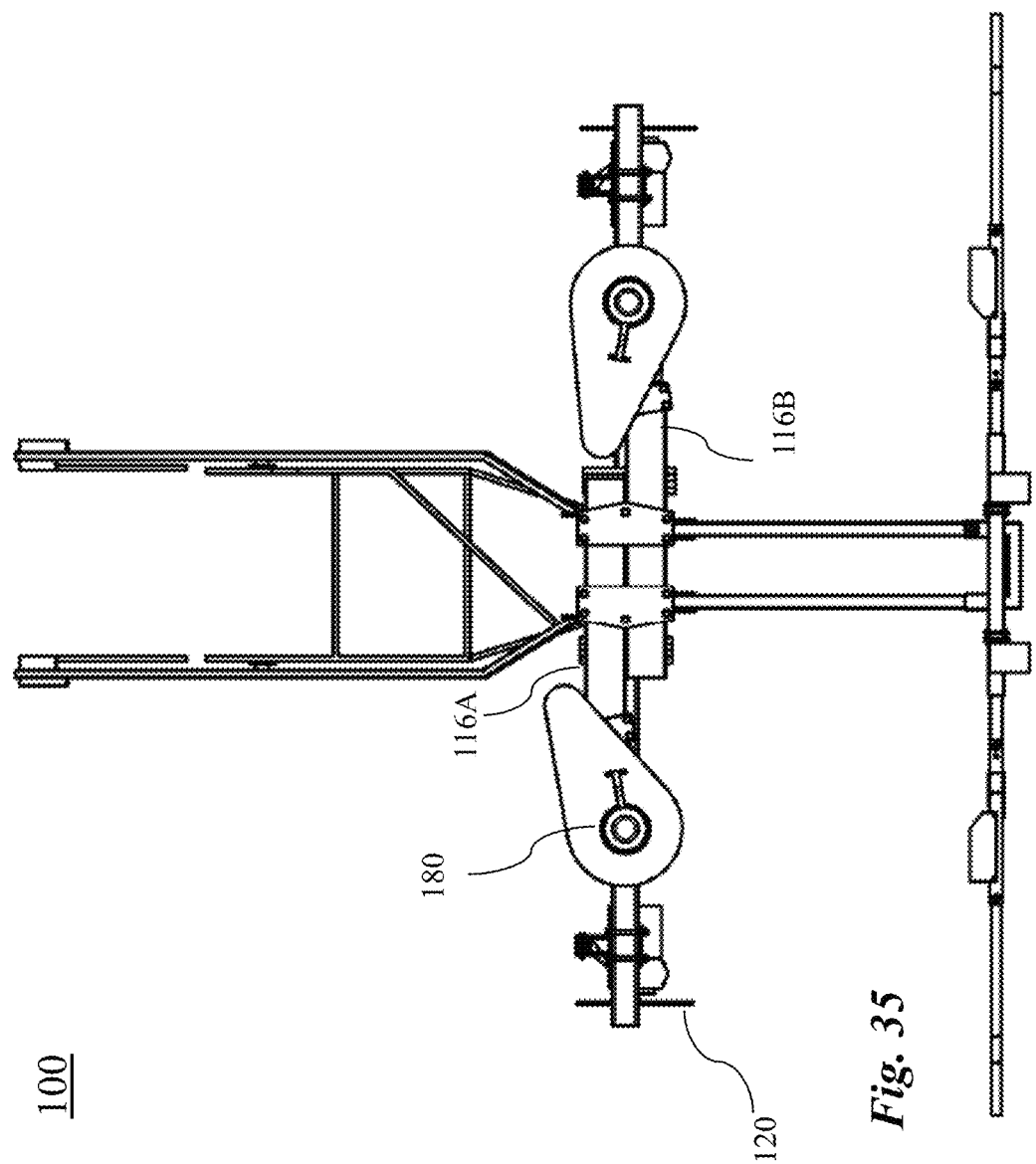
Figure 36:
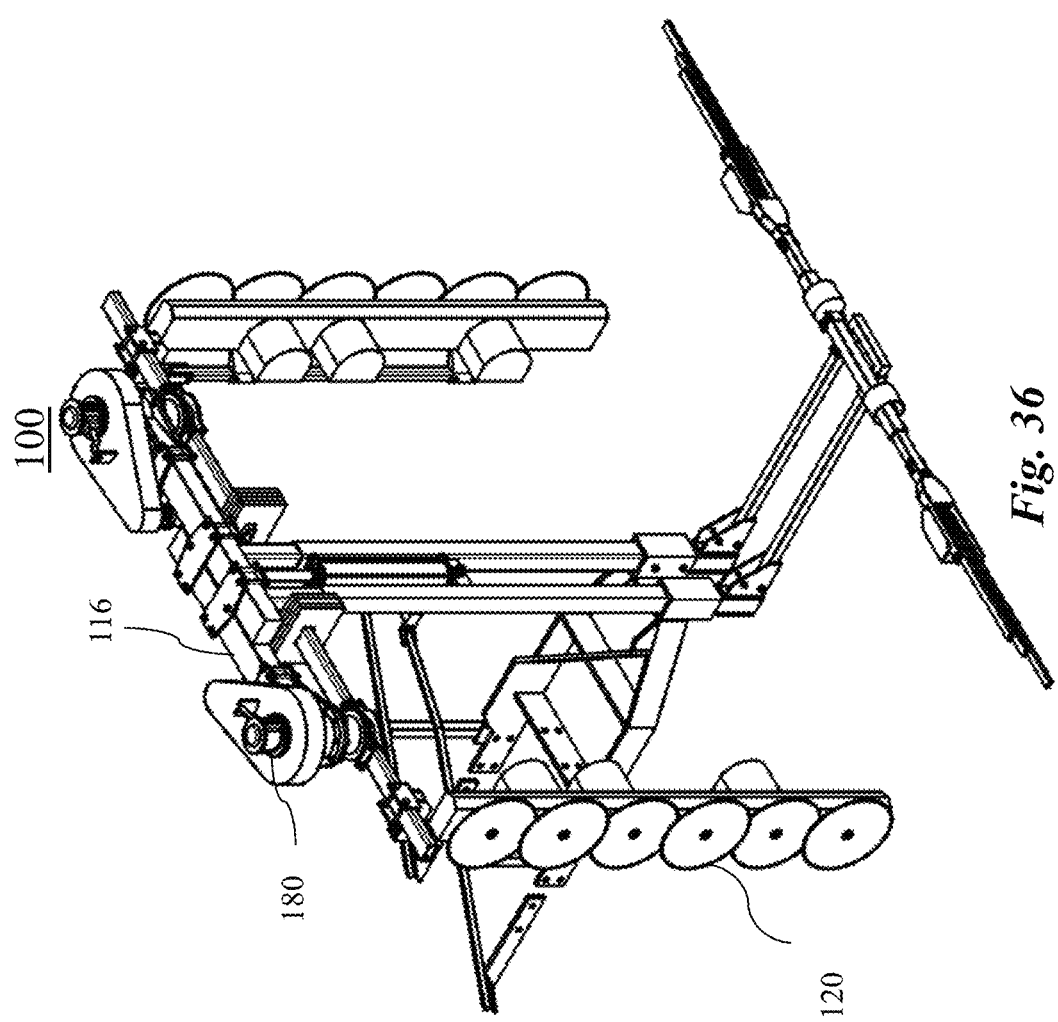
Figure 37:
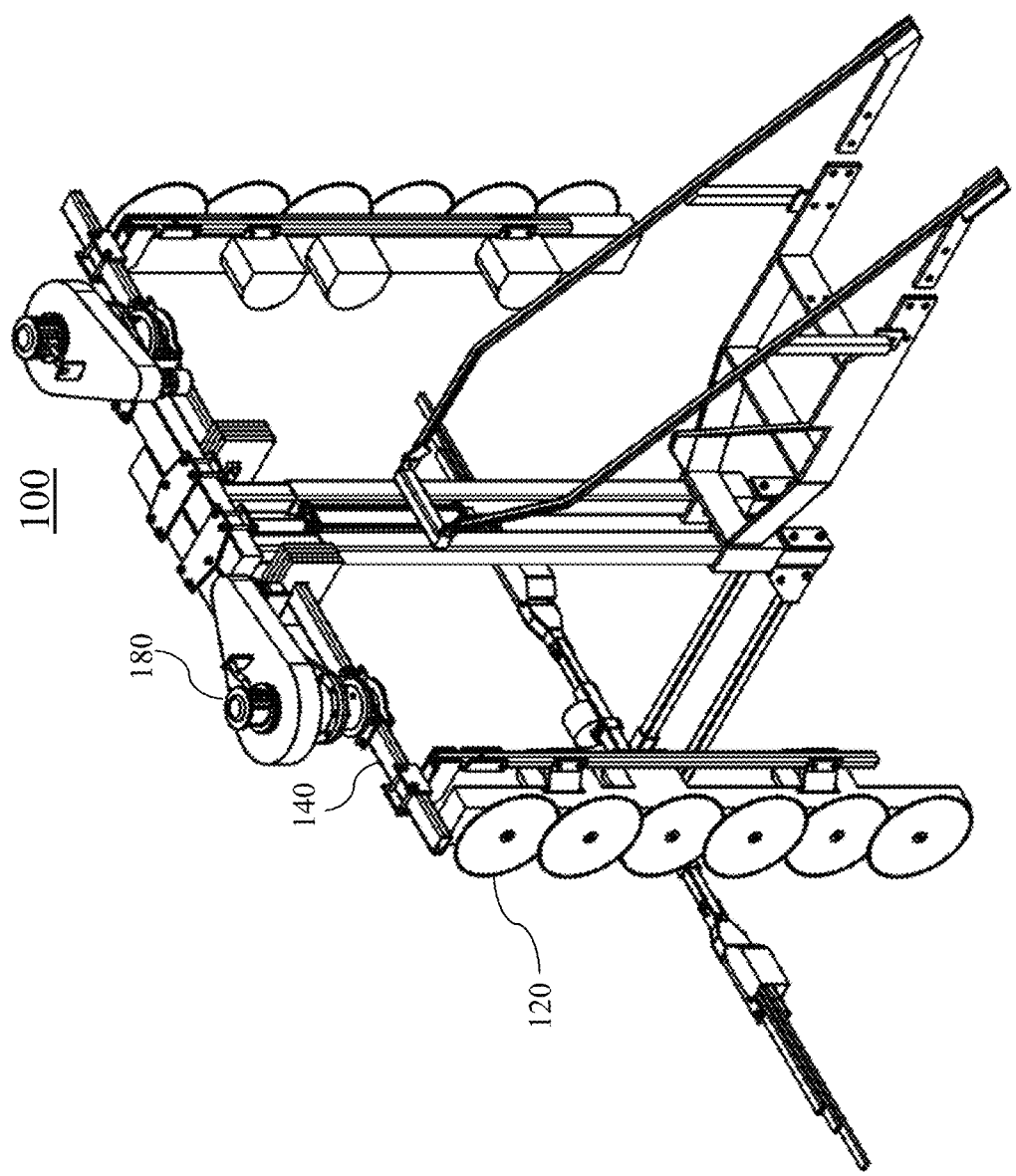

Turning now to FIG. 27, a detail drawing of the system 100 for pruning the hedges 200, 600 in an environment 10 is shown. Each of the blade assemblies 120 and each of the cutting arms 140 are shown as being similar to the blade assembly 120 and the cutting arm 140 shown in FIG. 15. The system 100 can also include two extension members 116 including extension members 116A, 116B each connecting to the cutting arms 140A, 140B, respectively, and connecting the elongated bodies 114. Additionally and/or alternatively, the system 100 can include one extension member 116 to connect to the cutting arms 140A, 140B, without limitation.

Alternative views of the system 100 as set forth in FIG. 27 are shown in FIGS. 28-37.

Figure 38:
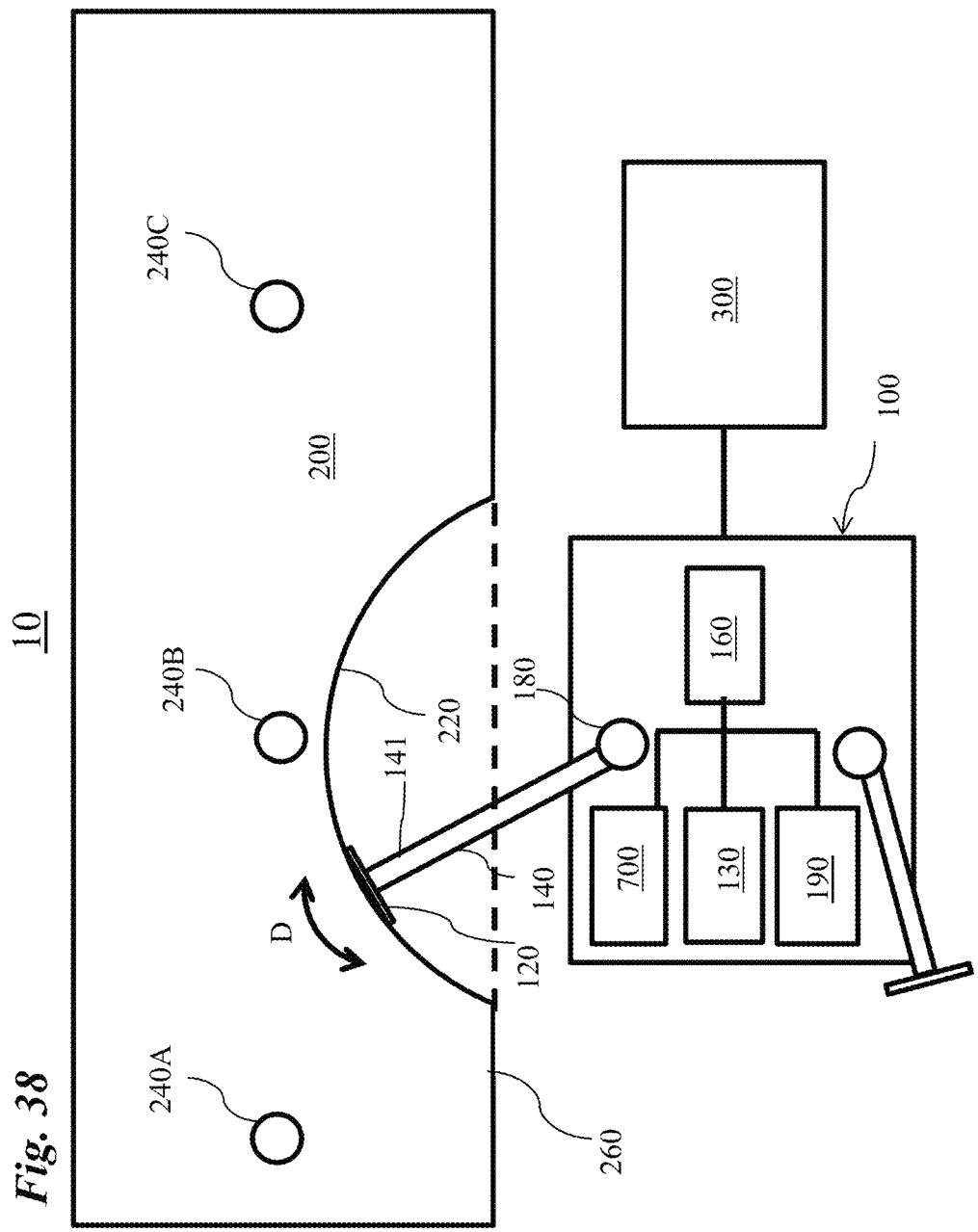
FIG. 38 is a diagram illustrating an alternative exemplary embodiment of the system of FIG. 26, wherein the system includes a power pack unit, a row finder and/or a control circuit.

Turning to FIG. 38, the system 100 can include a power pack unit 130. The power pack unit 130 can include any suitable device, circuit and/or machine configured to supply power for driving movement of the blade assembly 120 and/or the cutting arms 140. In one embodiment, the power pack unit 130 transfers power from the mobile platform 300 to the system 100. For example, the power pack unit 130 can include a PTO device. The power from the mobile platform 300 can be electrical, hydraulic, mechanical, thermal and/or any other suitable types. Additionally and/or alternatively, the system 100 can include a row finder sensor 190, as described below, for detecting a position of the plant 240B relative to the pivot point region 180. Additionally and/or alternatively, the system 100 can include a control circuit 700, as described below, for controlling operation of the blade assembly 120, the cutting arm 140, the row finder sensor 190 and/or the power pack unit 130.

Although FIG. 38 shows the power pack unit 130 as being located out of the pivot point region 180, the power pack unit 130 can be at least partially integrated with any devices located at the pivot point region 180. For example, in some embodiments, the power pack unit 130 can include actuators and/or motors located at the pivot point region 180 for driving the blade assembly 120 and/or the cutting arms 140. Although FIG. 38 shows the power pack unit 130, the row finder sensor 190, the control circuit 700, and the mounting assembly 160 as being individual units, the power pack unit 130, the row finder sensor 190, the control circuit 700, and/or the mounting assembly 160 can be at least partially integrated and/or share any structure or devices as appropriate. For example, the row finder sensor 190 can be connected to, and/or integrated with, certain electronic devices, such as light emitting devices 725 (shown in FIG. 43) that are part of the control circuit 700. Additionally and/or alternatively, the control circuit 700 can control switches (not shown) for controlling motors in the power pack unit 130 and thus can include a part of the power pack unit 130. Additionally and/or alternatively, the power pack unit 130, the row finder sensor 190, the control circuit 700 can each be at least partially located on, and/or be part of the mounting assembly 160. In some embodiments, the power pack unit 130, the row finder sensor 190 and/or the control circuit 700 can be configured to communicate, for example, using hardware connectors and buses and/or in a wireless manner.

Figure 39:
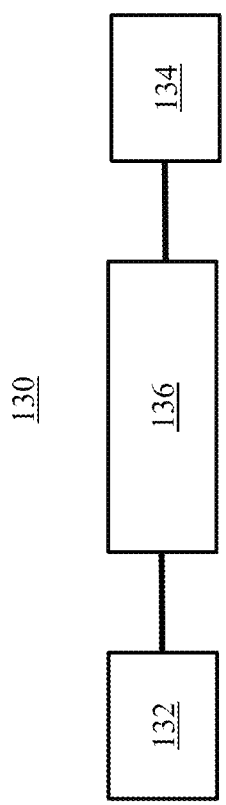
FIG. 39 is a diagram illustrating an exemplary embodiment of the power pack unit of FIG. 38, wherein the system includes a speed regulator.

Turning to FIG. 39, the power pack unit 130 is shown as including one or more arm motors 132 for rotating the cutting arms 140 (shown in FIG. 38), one or more blade motors 134 for rotating the blade assemblies 120 (shown in FIG. 38), and a speed regulator 136 for controlling speeds of the arm motors 132 and/or (optionally) the blade motors 134. The cutting arms 140 can be controlled by one or more uniform and/or different arm motors 132. The blade assemblies 120 can be controlled by one or more uniform and/or different blade motors 134.

In some embodiments, the power pack unit 130 can include two arm motors 132 including arm motors 132A, 132B (shown in FIG. 41) for controlling the cutting arms 140A, 140B, respectively. In some embodiments, the power pack unit 130 can include a plurality of blade assembly motors 134 including a plurality of blade assembly motors 134A (shown in FIG. 41) and a plurality of blade assembly motors 134B (shown in FIG. 41) for controlling the blade assemblies 120A, 120B respectively.

In some embodiments, the speed regulator 136 can be configured to control the speed of the arm motor(s) 132 that control the cutting arm 140 based upon a pressure or resistance on the blade motor(s) 134 that control the blade assembly 120 associated with the cutting arm 140. Stated somewhat differently, the speed regulator 136 can control the speed of the cutting arm 140 based upon a resistance that the blade assembly 120 receives during trimming.

For example, the blade assembly 120 can encounter a high resistance when cutting heavily-textured wood. The high resistance can increase the pressure on the blade assembly 120. The speed regulator 136 can sense the increase of the pressure (for example, above a selected, preset, and/or predetermined threshold level), and regulate the speed of the arm motor 132, such that the rotating speed of the cutting arm 140 can be reduced. By slowing down the cutting arm 140, the blade assembly 120 can maintain a suitable tip speed while trimming the heavily-textured wood, resulting in a clean cut. The clean cut can prevent unnecessary increase of cut surface area of the tree and does not tear away a cambium layer of the tree. Advantageously, the plant can be less susceptible to diseases.

Without the regulation of the speed of the cutting arm 140, when the blade assembly 120 encounters a high resistance when cutting heavily-textured wood while the cutting arm 140 rotates at a high speed, the tip speed of the blade assembly 120 can be reduced to an undesirable level. For example, when the blade motor(s) 134 is hydraulic, a relief valve (not shown) can divert fluid supply from the blade motor 134 to protect a pumping system (not shown), so the blade motor 134 can be slowed down. At the lower tip speed, the blade assembly 120 can tear off or pull, instead of cutting, a plant. Accordingly, the cambium layer of the plant can be torn, the plant can be de-barked and additional surface area of the plant can be unnecessarily exposed, negatively impacting the health of the plant. Alternatively, the rotation speed of the cutting arm 140 can be maintained at a low speed at all times, so the tip speed can maintain at a preset level even when cutting heavy wood. However, for many types of the hedges 200 (shown in FIG. 38), the blade assembly 120 encounters heavy wood only for a small fraction of time and thus the low speed is only needed for a small fraction of pruning operation. Therefore, keeping the cutting arm 140 at low speed at all times results in a reduced pruning efficiency. Alternatively, an operator can adjust the speed of the cutting arm 140 manually each time when cutting heavy wood. However, such a manual operation is time-consuming and complex, and cannot effectively adjust the speed of the cutting arm 140 promptly and precisely in response to detailed variation of texture or density in a plant.

In contrast, the speed regulator 136 can allow the blade assembly 120 to maintain the suitable tip speed in an automatic manner during the pruning, allow the cutting arm 140 to operate at a fast speed for cutting regular or light wood and slow down upon encountering increased wood density. Advantageously, the pruning can be of high efficiency and high precision.

The aforementioned problems are not applicable to, and thus cannot be solved by, conventional pruners for the following reasons. Conventional pruners have blades that only cut in a direction parallel to direction of movement of a tractor, so the tractor can adjust speed or slow down when cutting heavy wood, but the system 100 as disclosed may prune the hedge 200 while the mobile platform 300 is stopped. Further, the system 100 may use blades that cut in a direction non-parallel (e.g., perpendicular) to the direction of movement of the mobile platform 300 and controlled by rotation of the cutting arm 140. Further, conventional pruners can generate more trip speed by multiple blades across wood.

In some embodiments, the speed regulator 136 can include a sensor (not shown) for sensing a pressure and/or a resistance on the blade assembly 120. For example, the sensor can include any suitable pressure sensor, and pressure sensor can be is capacitive, electromagnetic, piezoelectric, or a combination thereof. Additionally and/or alternatively, the speed regulator 136 can include a programmable processor or controller (not shown) for instructing the arm motor(s) 132 based on signals from the sensor. Additionally and/or alternatively, the speed regulator 136 can include any other devices to achieve the functions as set forth above.

Figure 40:
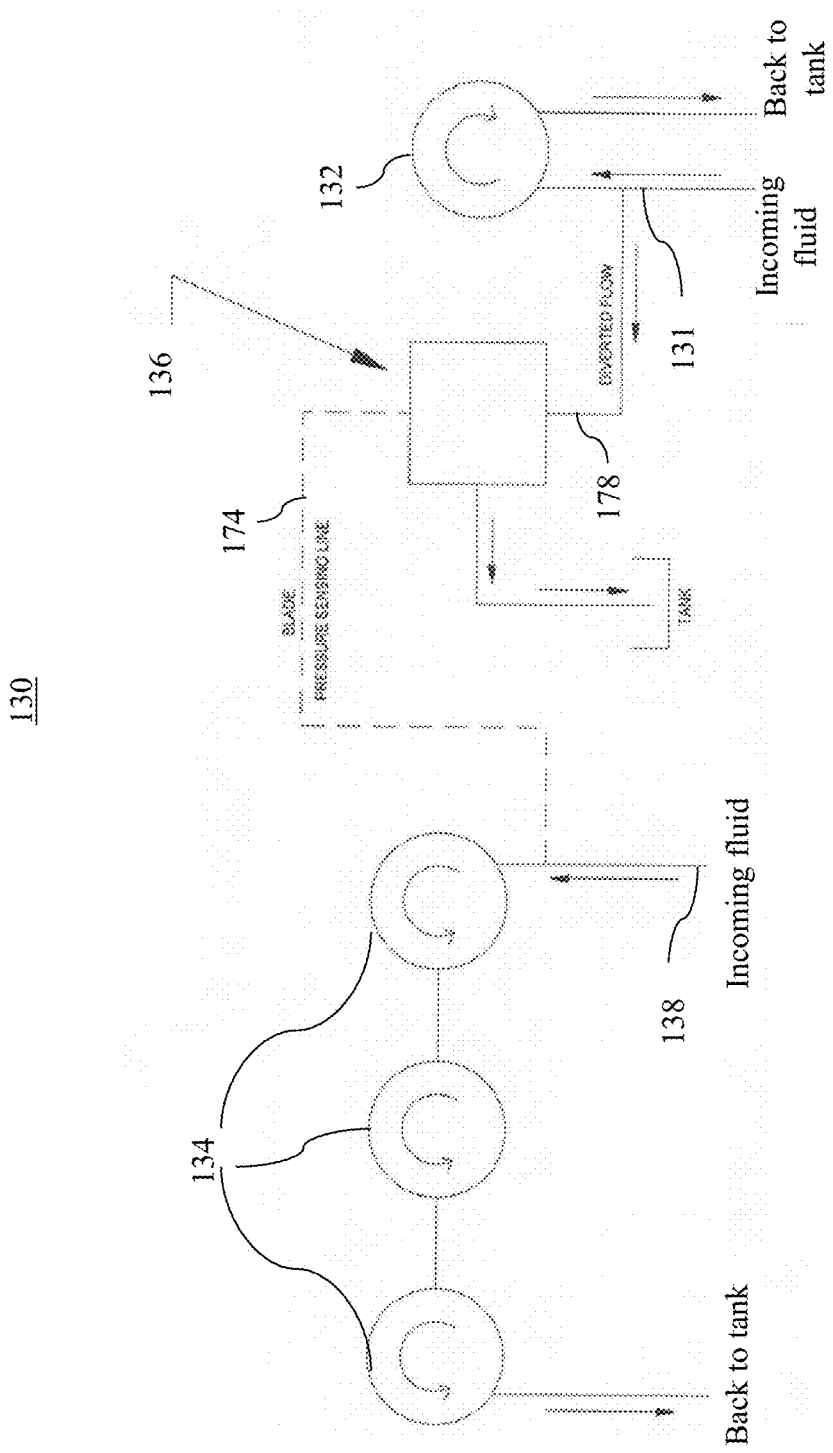
FIG. 40 is a diagram illustrating an exemplary embodiment of the power pack unit of FIG. 39, wherein the power pack unit is based on hydraulic power.

Turning to FIG. 40, the power pack unit 130 is shown as being based on hydraulic power. The power pack unit 130 can include the arm motor 132 and the blade motors 134 each being hydraulic. The speed regulator 136 can communicate with fluid lines 138, 131 each supplying incoming fluid to the blade motors 134 and the arm motor 132, respectively. The speed regulator 136 can be in communication with the fluid lines 138, 131 via a blade pressure sensing line 174 and a diverted flow line 178, respectively. The speed regulator 136 can sense the pressure of the fluid line 138 and release, based upon the pressure, a suitable amount of fluid from the fluid line 131, such that the arm motor 132 is slowed down.

Figure 41:
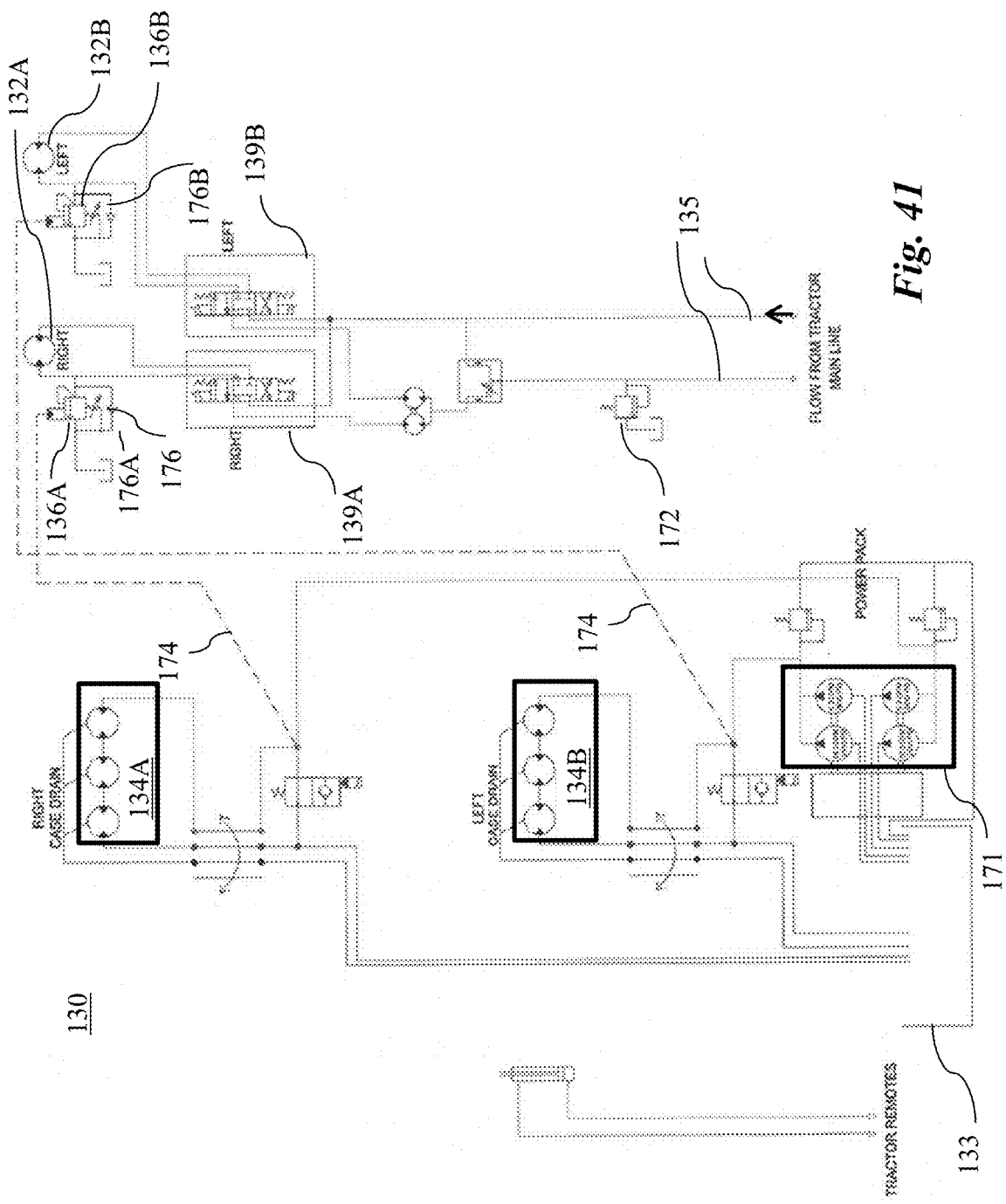
FIG. 41 is a diagram illustrating an exemplary embodiment of the power pack unit of FIG. 40, wherein the power pack unit is shown in detail.

In one embodiment, the speed regulator 136 can include a valve 176 (shown in FIG. 41). In another embodiments, the speed regulator 136 can include a pressure sensor (not shown) for sensing the pressure on the blade assembly 120 and a programmable processor or controller (not shown).

By using hydraulically-driven motors, the speed regulator 136 can sense the pressure of the flow through the hydraulic lines, to indirectly detect the actual resistance on the blades or the actual blade speed. When the blades are driven by an electric motor, the speed regulator 136 can sense the speed of the blade directly to determine the resistance.

Turning to FIG. 41, the power pack unit 130 is shown as including two speed regulators 136A, 136B, each shown as including valves 176A, 176B, respectively. Each of the valves 176A, 176B can include a counterbalance valve. The counterbalance valve can include a spring with a spring force adjustable. For example, prior to pruning, the spring force of the valve 176 can be adjusted such that the pressure on the blade assembly 120A and the amount of released fluid can have a correlation relationship that can be preset. Accordingly, for each pressure (and/or resistance), and/or a range thereof, on the blade assembly 120A, the rotating speed of the arm motor 132A can be regulated at a corresponding value and/or in a corresponding range of values. Any suitable valve can be used in the power pack unit 130 for implementing the functions set forth above. An exemplary counterbalance valve can include Sun model CBB-BLHN adjustable counterbalance valve, available from Helios Technologies, located in Sarasota, Fla.

By using the valve 176A and adjusting the spring force, a suitable correlation relationship between the pressure (and/or resistance) on the blade assembly 120A and the rotating speed of the arm motor 132A can advantageously be achieved in a simple and inexpensive manner.

FIG. 41 shows the power pack unit 130 as including additional and/or alternative components including a tank (or reservoir) 133 for holding fluid required to supply the blade motors 134A, 134B, hydraulic hose(s) 135 for transporting the fluid from (and/or to) a pump on the mobile platform 300, two sets of double open center pumps 171 respectively for the blade motors 134A, 134B. The power pack unit 130 can include one or more relief valves 172 for releasing fluid to a tank on the mobile platform 300, return oil cooler (not shown) and/or return oil filter (not shown), PTO drive lines (not shown).

Although the power pack unit 130 is shown as being at least partially an open center system for illustrative purposes only, the power pack unit 130 can be an open center system, a closed center system, or a combination thereof, without limitation.

In an illustrative example, if the pumps 171 are pumping 5 gallons per minute to the blade motors 134A at 100 psi under normal conditions, the blade motors 134A can allow 5 gallons per minute of fluid (such as oil) to pass through them. If the blade (not shown) is slowed by an outside force (or resistance), then the blade motor 134A is not able to allow the 5 gallons per minute to flow through. The pump 171 continues to send 5 gallons per minute of fluid through the hydraulic system, thus creating a "backup of fluid" resulting in an increase of fluid pressure within the hydraulic lines. For example, the pressure may increase to 120 psi. The speed regulator 136A can sense the increase of pressure, and subsequently the valve 176A can open and divert fluid going to the cutting arm 140A and reroutes the fluid to a tank.

In another illustrative example, when resistance on the blade inreases, hydraulic fluid flow (in gallons per minute) through the blade motor 134A decreases. Subsequently, hydraulic fluid pressure in the fluid line 138 increases. The speed regulator 136A senses the hydraulic fluid pressure. A bypass valve (or the valve 176A) in the speed regulator 136A opens. A portion of the hydraulic fluid in the fluid line 131 is allowed to divert through the diverted flow line 178 and through the speed regulator 136A, and return to a hydraulic fluid supply tank. The arm motor 132A is slowed due to a reduction of hydraulic flow (in gallons per minute) via the opening of the bypass valve in the speed regulator 136A.

Figure 42:
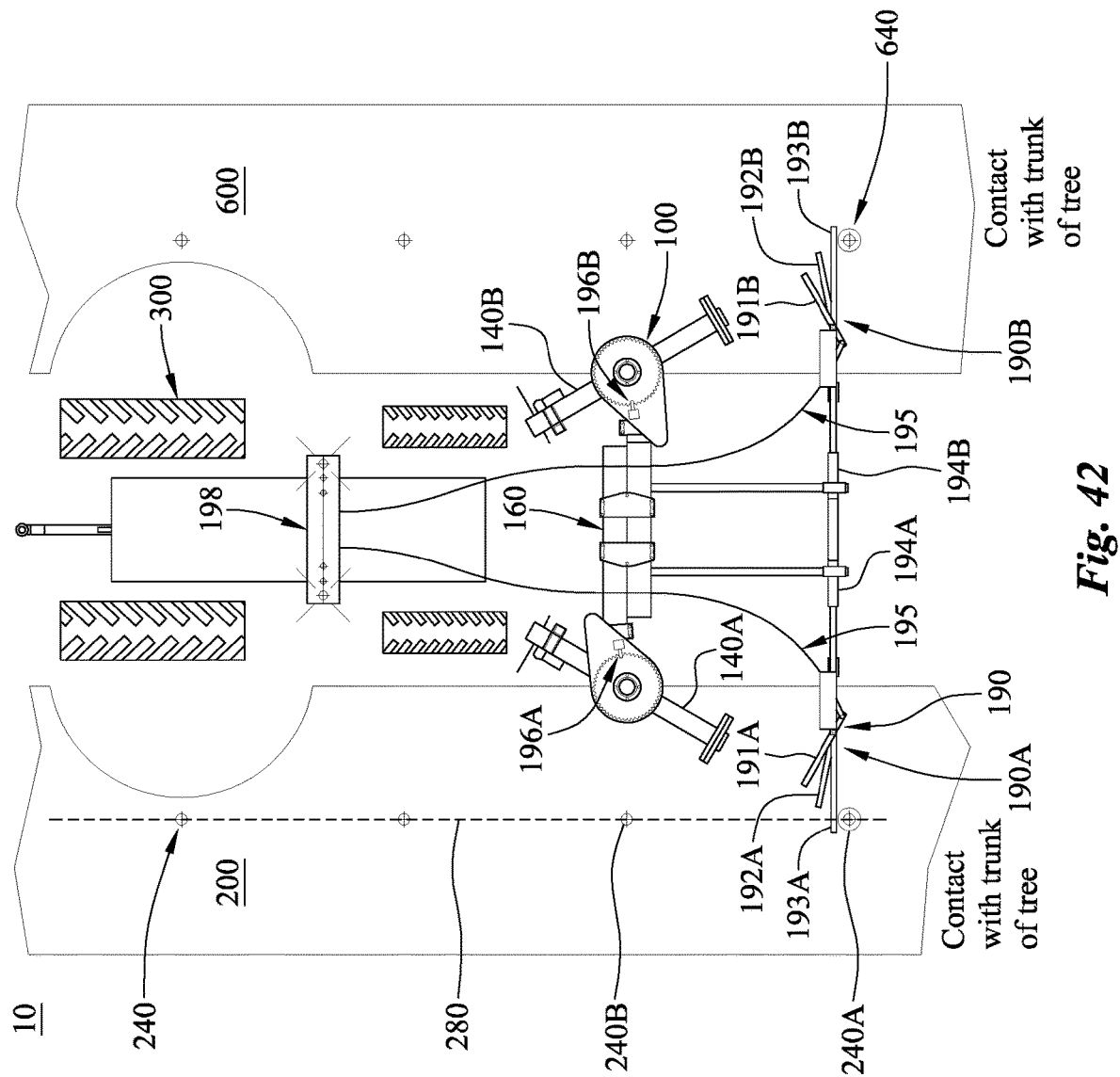
FIG. 42 is a diagram illustrating an alternative exemplary embodiment of the system of FIG. 26, wherein the row finder is shown in detail.

Turning to FIG. 42, the row finder 190 can include row finder sensors 190A, 190B that include one or more detector levers including 191A-193A and 191B-193B, respectively. Stated somewhat differently, when the cutting arms 140A, 140B are respectively on each side of the system 100, the row finder sensors 190A can detect the position of the cutting arm 140A relative to a selected plant 240. Similarly, the row finder sensors 190A can detect the position of the cutting arm 140B relative to a selected plant 640. The detector levers 191A-193A can each extend in a direction that intersects with the hedge 200, and/or a line 280 defining a row of the plants 240 during pruning. The detector levers 191A-193A can extend proximally toward the hedge 200 by different distances, respectively. Stated somewhat differently, the detector levers 191A-193A can extend proximally toward a tree trunk of the tree 240A by different distances, respectively. The detector levers 191A-193A can be coupled with switching devices 721A-723A (shown in FIG. 43), such that when any one of the detector levers 191A-193A contacts a trunk of the plant 240, the corresponding one of the switch devices 721A-723A can be triggered and can generate a signal (not shown) to be transmitted via signal wire(s) 195, for example. Exemplary switch devices 721A-723A can include any suitable switches including, for example, miniature snap-action switch and/or micro switches (available from Honeywell International Inc., located in Charlotte, N.C.).

In some embodiments, when the shortest detector lever 191A touches a tree trunk, the cutting arm 140A may be too close to the hedge 200, or extends too much into the hedge 200 and thus may cut certain structures (for example, trellis and/or metal wires supporting growth of the plants 240) that should not be cut. In that case, the signal from the switch device 721A can warn the operator.

Exemplary signals from the switch devices 721A-723A can include electric signals used for turning on respective lights on an operator light bar (or operator panel) 198 located in the mobile platform 300. For example, when the shortest detector lever 191A touches a tree trunk, a warning beacon 724 (shown in FIG. 43) on the operator light bar 198 can light up to warn the operator, so the operator can move the mobile platform 300 and/or the system 100 farther from the hedge 200 by a suitable distance. In one embodiment, the switch devices 721A-723A can turn on the light emitting devices 725 that are red, yellow, and green, respectively. For example, red, yellow and green can respectively indicate that the system 100 is too close to the trunk of the plant 240A (so the pruning is not safe for the hedge 200), that the system 100 is very close to the trunk of the plant 240A and the operator should check the positioning of the system 100, and that the system 100 is at a sufficient distance from the trunk of the plant 240A so the pruning can be performed.

Additionally and/or alternatively, the signal can be converted into electronic and/or digital data signal and inputted into a computer system such as a pruning system controller 500 (shown in FIG. 44), so the pruning system controller 500 can determine and/or calculate the relative position of the cutting arm 140A from the hedge 200.

Additionally and/or alternatively, the row finder sensor 190A can include a row finder camera 194A for capturing an image of a tree truck for the operator to visually determine a distance of the mobile platform 300 and/or the system 100 from the plant 240.

In one embodiment, the row finder sensor 190A can detect a position of the system 100 relative to the plant 240A and move the mobile platform 300 forward for the cutting arm 140A to prune the plant 240A. In another embodiment, the row finder sensor 190A can detect a position of the system 100 relative to the plant 240A and rotate the cutting arm 140A to prune the plant 240B in case that the distances from the plants 240A, 240B to the system 100 are similar or the same, and that spacing between neighboring plants 240A, 240B is suitable for such detecting and pruning. In yet another embodiment, the row finder sensor 190A can be installed at an alternative position (not shown) such that, with the mobile platform 300 making one stop, the row finder sensor 190A can detect a position of the system 100 via contacting the plant 240B, and can prune the plant 240B.

By using the row finder sensors 190A, relative positions among the cutting arm 140A, the pivot point region 180A, and the individual plant 240 to be pruned can be detected. Advantageously, the mobile platform 300 can be stopped at a precise location to initiate the pruning without damaging the plant 240 or any other crucial structures adjacent to the plant 240.

Although FIG. 42 shows the row finder sensors 190A includes three detector levers 191A-193A for illustrative purposes only, the row finder sensors 190A can include any number of same and/or different detector levers or any other touch sensors, without limitation. Alternative views of the row finder sensors 190A, 190B are shown, for example, in FIG. 32. FIG. 42 shows the system 100 as including additional and/or alternative components including rotational stop switches 196A, 196B for the cutting arms 140A, 140B to stop at a specific position after each cycle.

Figure 43:
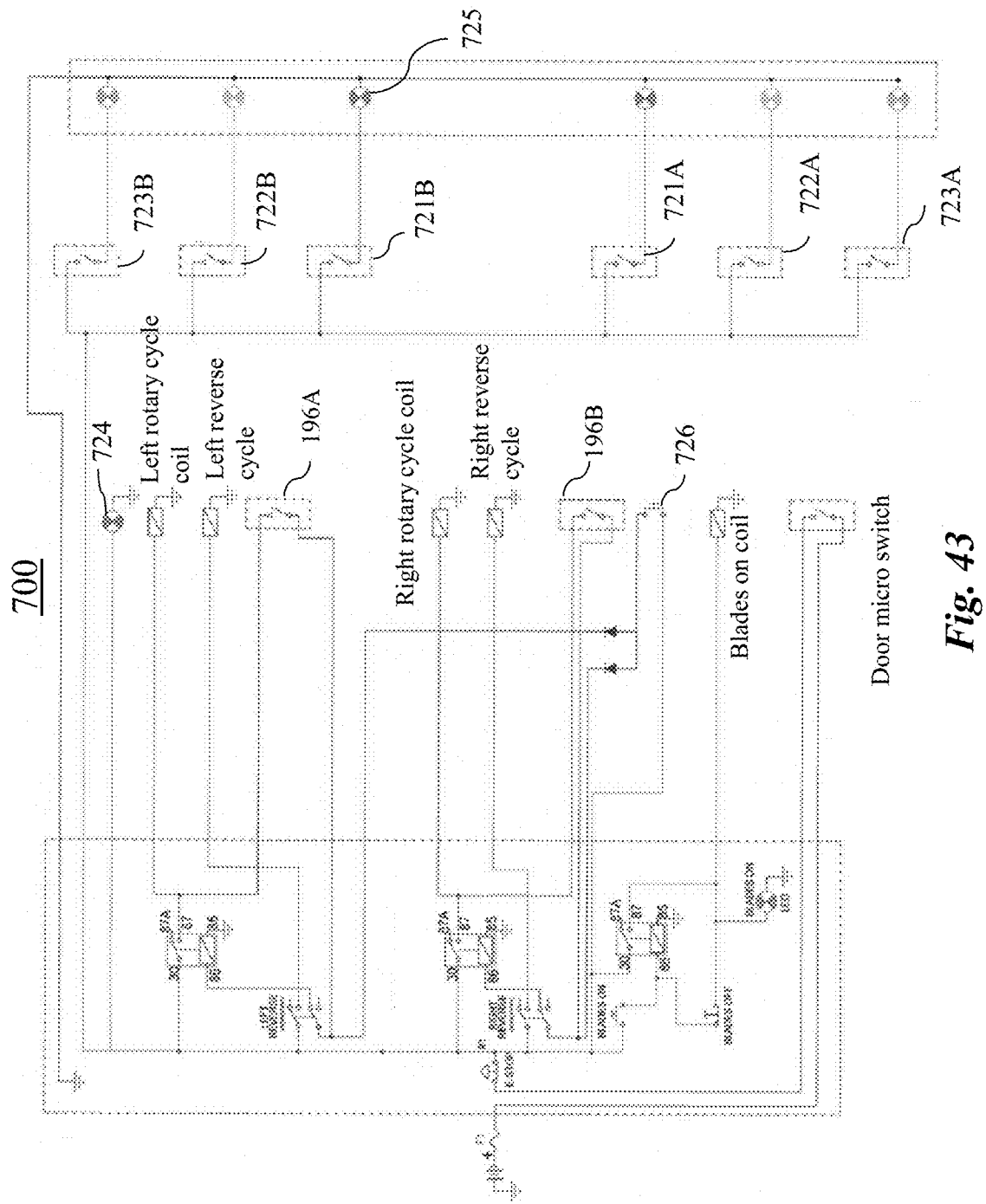
FIG. 43 is a diagram illustrating an alternative exemplary embodiment of the system of FIG. 26, wherein the control circuit is shown in detail.

Turning to FIG. 43, the control circuit 700 can include at least one push button (not shown) for activating the pruning. In one embodiment, one single push button can activate the pruning by both of the cutting arms 140A, 140B. Optionally, the button can start the cutting arms 140A and 140B in forward 360-degree cycles upon being depressed. The button can be released and the 360 degree-cycles of the cutting arms 140A and 140B can continue. In another embodiment, the cutting arms 140A, 140B can each be activated by a respective push button.

Additionally and/or alternatively, the control circuit 700 can include switch(es) for reversing a selected cutting arm 140 (shown in FIG. 38) to clear problems such as jamming (for example, during pruning of large bush or when encountering trellis wire problems). The switch can be controlled via one or more push buttons 726, for example. Although one push button 726 is shown for illustrative purposes only, two push button 726 can be used for controlling the cutting arms 140A, 140B, respectively. For example, if the cutting arm 140A encounters a need to be reversed, the cutting arm 140A can be reversed while the cutting arm 140B continues an automatic 360-degree cycle. Advantageously, reduction of pruning efficiency by problems, such as jamming, can be minimized. An exemplary push button 726 can be momentary-type. Stated somewhat differently, when the push button 726 corresponding to the cutting arm 140A is depressed, the cutting arm 140A can move in reverse and, when the button 726 is released, the cutting arm 140A can stop.

Figure 44:
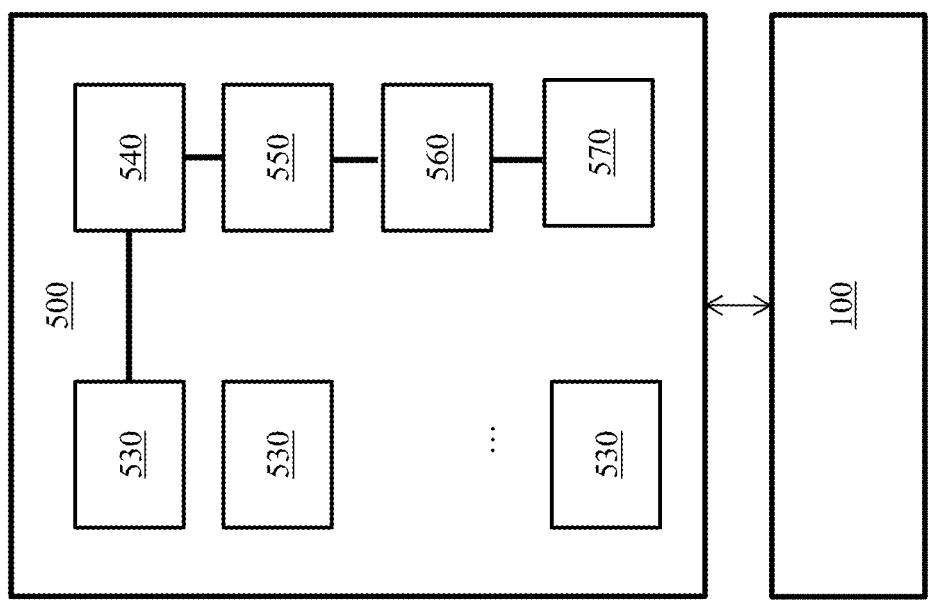
FIG. 44 is a diagram illustrating an exemplary embodiment of a pruning system controller for controlling the system of FIG. 1.

Turning now to FIG. 44, a pruning system controller 500 is shown as being in communication with the system 100. In some embodiments, the power pack unit 130, the row finder sensor 190, and/or the control circuit 700 can be configured to communicate with and/or be at least partially integrated with the pruning system controller 500. The pruning system controller 500 can include one or more optional sensors 530. The pruning system controller 500 can include any number of sensors 530, as desired—for example, 1, 2, 3, 4, 5, 6, or even a greater number of sensors 530. The sensors 530 can be arranged in any desired manner on the pruning system controller 500, the mobile platform 300 (shown in FIG. 1) and/or on the system 100, with the specific arrangement of sensors 530 depending on the application. The sensors 530 can optionally be lightweight and capable of high-frequency data collection so as to facilitate real-time operation, including optional object distance detection and image analysis of the appearance of the hedge 200 (shown in FIG. 1) or the plants 240A-240C (shown in FIG. 1). Exemplary sensors 530 suitable for use in the pruning system controller 500 include, but are not limited to, color or monochrome visual sensors, electro-optical sensors, thermal/infrared sensors, time-of-flight sensors, ultrasound sensors, multi-spectral imaging sensors, spectrophotometers, spectrometers, thermometers, illuminometers, microphones/sonic transducers, and others.

The sensors 530 can interface with one or more processors 540. The processors 540 can function as a trip controller for directing some or all operations of the mobile platform 300, such that the mobile platform 300 can travel under human operation and/or in a driverless manner. When the mobile platform 300 includes a tractor, the processors 540 can function as an auto pilot controller. Without limitation, each processor 540 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processors 540 can be configured to perform any of the methods described herein, including but not limited to, a variety of operations relating to object distance detection, image analysis, and pruning parameter calculation. The processors 540 can be configured to control power supply from the mobile platform 300 to the system 100.

In some embodiments, the processors 540 can include specialized hardware and/or software for processing specific operations relating to the methods described herein—for example, processing ultrasound data, processing visual sensor data, calculating distance based on collected data, determining status of the plants 240A-240C and requirements of pruning, calculating parameters of the system 100, and controlling the mobile platform 300 and/or the system 100 based on the parameters. Exemplary parameters can include relative position between the mobile platform 300 and hedge 200 (or a specific plant of plants 240A-240C). Exemplary parameters can include lengths of the cutting arm 140 (shown in FIG. 1), the standing member 110 (shown in FIG. 3) and/or the extension member 116 (shown in FIG. 5). Additionally and/or alternatively, exemplary parameters can include selectively turning on/off part of the blade assembly 120 (shown in FIG. 1), controlling blade speed of the blade assembly 120, height of the cutting arm 140, height of the wheel 150 (shown in FIGS. 12A-12B), and/or rotation of the cutting arm 140. Additionally and/or alternatively, the processors 540 can be configured to direct the mobile platform 300 to stop and go at selected time and/or space interval, such that every Nth plant in the hedge 200 is pruned. N can be any selected integral number.

In some embodiments, the processor 540 can be located in physical proximity to the sensors 530. In such cases, the processor 540 and the sensors 530 can be configured to communicate locally, for example, using hardware connectors and buses. An advantage of local communication is that transmission delay can be reduced to facilitate real-time object distance detection and image analysis.

In other embodiments, the processors 540 can be at least partially located remotely from the sensors 530. Measurement data obtained by the sensors 530 can be transmitted to the remote processors 540 for processing. The remote processors 540 can generate a control signal based on the measurement data and send the control signal back to the mobile platform 300. Various wireless communication methods can be used for remote communication between the sensors 530 and the processors 540. Suitable communication methods include, for example, radio, Wireless Fidelity (Wi-Fi), cellular, satellite, and broadcasting.

As shown in FIG. 44, the pruning system controller 500 can include one or more additional hardware components (not shown), as desired. Exemplary additional hardware components include, but are not limited to, a memory 550 (for example, a random access memory (RAM), static RAM, dynamic RAM, read-only memory (ROM), programmable ROM, erasable programmable ROM, electrically erasable programmable ROM, flash memory, secure digital (SD) card, etc.), and/or one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). One or more input/output devices 560 (for example, buttons, a keyboard, keypad, trackball, displays, and a monitor) can also be included in the pruning system controller 500, as desired.

Additionally, and/or alternatively, the pruning system controller 500 can include a communication module 570. The communication module 570 can include any conventional hardware and software that operates to exchange data and/or instruction between the pruning system controller 500 and another computer system (not shown) using any wired and/or wireless communication methods. For example, the pruning system controller 500 can receive remote instruction corresponding to the mobile platform 300 via the communication module 570. Exemplary communication methods include, for example, radio, Wireless Fidelity (Wi-Fi), cellular, satellite, broadcasting, or a combination thereof.

The sensors 530, processor 540, the memory 550, the communication module 570, and/or the input/output device 560 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A system for hedge pruning, comprising:
a mounting framework for connecting to a tractor;
one or more elongated bodies perpendicular to the ground and each having first and second end regions proximal to and distal from the ground, respectively, the first end regions being coupled to the mounting framework;
one or more extension members arranged parallel to the ground and coupled to the second end region of the elongated bodies, the extension members defining two pivot point regions proximal to left and right sides of the tractor, respectively;
two cutting arms each being coupled to one of the pivot point regions, parallel to the ground and closer to the ground than the extension members;
two blade assemblies each including a plurality of rotary blades arranged into a column perpendicular to the ground and having an end region connected to the cutting arm, with a surface of the rotary blades perpendicular to the cutting arm;
one or more hydraulic arm motors located at each of the pivot point regions for rotating the cutting arms;
one or more hydraulic blade motors located at each of the blade assemblies for rotating the rotary blades; and
at least one row finder sensor coupled to one of the elongated bodies and being configured for sensing a position of one of the cutting arms relative to one of two hedges,
wherein, upon being triggered by a switch in the tractor via a control circuit, each of the cutting arms is configured to rotate by a full circle in a plane parallel to the ground, such that the blade assemblies cut out a notch in each of the two hedges based upon rotating of the cutting arms.

2. The system of claim 1, wherein the at least one row finder sensor includes two row finder sensors coupled to two of the elongated bodies, respectively, each row finder sensor being configured for sensing a position of one of the cutting arms relative to one of two hedges.

3. A method for hedge pruning, comprising:
moving a system for hedge pruning to be at a selected distance from a hedge, the system including:
a mounting assembly for connecting to a mobile platform;
a cutting arm rotatably coupled to the mounting assembly and connected with a blade assembly; and
a row finder sensor coupled to the mounting assembly and configured for sensing a position of the cutting arm relative to the hedge; and
rotating the cutting arm such that the blade assembly prunes the hedge along an arc defined based upon said rotating.

4. The method of claim 3, wherein the blade assembly includes one or more blades arranged in a column, the column including first and second end regions proximal to and distal from the ground during said rotating, respectively, and wherein said rotating includes forming a dent in the hedge, the dent being shaped based upon the arc and a length of the column.

5. A system for hedge pruning, comprising:
a mounting assembly for connecting to a mobile platform, the mounting assembly defining a pivot point region thereon;
a cutting arm rotatably coupled to the mounting assembly at the pivot point region;
a blade assembly connected to an end region of the cutting arm such that the blade assembly is configured to prune a hedge along an arc based upon a rotation of the cutting arm about the pivot point region; and
a row finder sensor coupled to the mounting assembly and configured for sensing a position of the cutting arm relative to the hedge.

6. The system of claim 5, wherein the mounting assembly includes a standing member coupled to the cutting arm at the pivot point region, the standing member including:
at least one elongated body having first and second end regions being proximal to and distal from the ground during operation, respectively; and
an extension member coupled to the second end region of the elongated body and coupled to the cutting arm at the pivot point region.

7. The system of claim 5, wherein the blade assembly includes one or more blades arranged in a column, the column of the blade assembly including first and second end regions proximal to and distal from the ground, respectively.

8. The system of claim 7, wherein the column is perpendicular to the ground during pruning.

9. The system of claim 7, wherein the blade assembly is coupled to the cutting arm at the second end region of the blade assembly.

10. The system of claim 5, wherein the cutting arm is parallel to the ground during pruning.

11. The system of claim 5, wherein the arc based upon the rotation of the cutting arm is in a plane parallel to the ground.

12. The system of claim 5, wherein the cutting arm is configured to have a rotation speed that is regulated based upon a resistance against the blade assembly.

13. The system of claim 12, further comprising a power pack unit including:
at least one arm motor for driving the rotation of the cutting arm;
at least one blade motor for driving the blade assembly; and
a speed regulator for regulating a rotation speed of the arm motor based upon the resistance against the blade assembly and associated with the blade motor.

14. The system of claim 13, wherein said power pack unit operates at least partially based upon hydraulic power, the arm motor and the blade motor are hydraulic, and the speed regulator includes a valve in communication with one or more fluid lines supplying respective fluids to the arm motor and the blade motor.

15. The system of claim 14, wherein:
the valve is configured to sense a fluid pressure within a selected fluid line supplying the fluid to the blade motor; and
the valve is configured to release, upon sensing that the fluid pressure is higher than a preset threshold level, an amount of the fluid from a selected fluid line supplying the fluid to the arm motor such that the rotation speed of the arm motor is reduced.

16. The system of claim 15, wherein the valve includes a counterbalance valve configured with a spring force such that the rotation speed of the arm motor has a correlation relationship with the pressure associated with the fluid line supplying the fluid to the blade motor.

17. The system of claim 5, wherein the row finder sensor includes one or more detector levers each extending in a direction that intersects with the arc based upon the rotation of the cutting arm, and wherein the detector levers are coupled with respective switching devices configured to detect a contact between the detector levers and the hedge.

18. The system of claim 17, wherein the one or more detector levers include a plurality of detector levers located at a plurality of distances from the pivot point region, respectively, and each of the switching devices generates a signal for activating a light emitting device in the mobile platform upon detecting the contact between the hedge and the detector lever coupled with the switching device.

19. The system of claim 5, wherein the row finder sensor includes a camera configured for capturing an image for a trunk of a tree of the hedge.

20. The system of claim 5, wherein, the pivot point region is a first pivot point region, the cutting arm is a first cutting arm, the blade assembly is a first blade assembly, and the mounting assembly further defines a second pivot point region thereon, the system further comprising:
a second cutting arm rotatably coupled to the mounting assembly at the second pivot point region; and
a second blade assembly connected to an end region of the second cutting arm, the first and second cutting arms each rotate such that the first and second blade assemblies prune hedges on left and right sides of the mobile platform, respectively.

* * * * *